(12) United States Patent
Visser et al.

(10) Patent No.: US 12,374,184 B2
(45) Date of Patent: Jul. 29, 2025

(54) GAMING DEVICE WITH WHEELS FOR AWARDING COMPOSITE FEATURES

(71) Applicant: Aristocrat Technologies Australia Pty Limited, North Ryde (AU)

(72) Inventors: Antoon Visser, Coogee (AU); James Loader, Springfield (AU); Joshua Matos, Cordeaux Heights (AU); Luke Ireland, Denistone (AU); Karen Kendall, Toongabbie (AU)

(73) Assignee: Aristocrat Technologies, Inc., Las Vegas, NV (US)

( * ) Notice: Subject to any disclaimer, the term of this patent is extended or adjusted under 35 U.S.C. 154(b) by 270 days.

(21) Appl. No.: 17/945,591

(22) Filed: Sep. 15, 2022

(65) Prior Publication Data

US 2023/0106453 A1  Apr. 6, 2023

(30) Foreign Application Priority Data

Sep. 27, 2021 (AU) ............................... 2021903283
Oct. 1, 2021 (AU) ............................... 2021903149
Jun. 23, 2022 (AU) ............................... 2022204451

(51) Int. Cl.
  *G07F 17/34* (2006.01)
  *G06F 7/58* (2006.01)
  *G07F 17/32* (2006.01)

(52) U.S. Cl.
  CPC .......... *G07F 17/3213* (2013.01); *G06F 7/588* (2013.01); *G07F 17/3267* (2013.01)

(58) Field of Classification Search
  CPC . G07F 17/3267; G07F 17/588; G07F 17/3213
  See application file for complete search history.

(56) References Cited

U.S. PATENT DOCUMENTS

| | | | |
|---|---|---|---|
| 2009/0253479 A1* | 10/2009 | Bennett | G07F 17/3244 463/16 |
| 2010/0029381 A1 | 2/2010 | Vancura | |
| 2016/0253873 A1 | 9/2016 | Olive | |
| 2019/0073878 A1* | 3/2019 | Kendall | G07F 17/34 |
| 2019/0080551 A1* | 3/2019 | Marston | G07F 17/34 |
| 2020/0074791 A1* | 3/2020 | Uberuaga | G07F 17/3213 |
| 2020/0111312 A1 | 4/2020 | Olive | |
| 2021/0217276 A1 | 7/2021 | Sidoti | |

* cited by examiner

*Primary Examiner* — David L Lewis
*Assistant Examiner* — Shauna-Kay Hall
(74) *Attorney, Agent, or Firm* — Greenberg Traurig, LLP

(57) ABSTRACT

An electronic gaming machine comprising a display device, a random number generator, a processor, and a memory storing instructions which, cause the processor to, in response to a feature wheel initiation condition being met: select, based on one or more random numbers dynamically generated by the random number generator, stopping positions for a plurality of feature wheels, each of the feature wheels being associated with a different feature event corresponding to a spinning reel, and each of the feature wheels comprising a plurality of outcomes at different stopping positions, wherein at least one of the different stopping positions corresponds to an outcome; control the display device to display spinning to the stopping positions selected; determine whether to provide an outcome from the plurality of outcomes; and upon determining to provide more than one outcome comprising the feature event, initiate a composite feature event.

20 Claims, 24 Drawing Sheets

|  | Reel Strip 1 | Reel Strip 2 | Reel Strip 3 | Reel Strip 4 | Reel Strip 5 |
| --- | --- | --- | --- | --- | --- |
| 301 | A | 10 | Q | 10 | PIC1 |
| 302 | PIC3 | J | K | PIC2 | DYNSCAT |
| 303 | PIC3 | Q | 9 | PIC3 | PIC3 |
| 304 | PIC2 | Q | PIC2 | 9 | Q |
| 305 | K | A | PIC1 | Q | A |
| 306 | DYNSCAT | DYNSCAT | 10 | A | Q |
| 307 | COR | PIC1 | K | A | Q |
| 308 | A | J | WILD | 10 | WILD |
| 309 | J | Q | J | PIC2 | K |
| 310 | 10 | K | PIC3 | K | 9 |
| 311 | A | 9 | Q | PIC1 | DYNSCAT |
| 312 | PIC3 | K | PIC3 | DYNSCAT | 10 |
| 313 | 10 | 10 | SCAT2 | A | 10 |
| 314 | DYNSCAT | DYNSCAT | Q | J | Q |
| 315 | K | WILD | Q | 10 | A |
| 316 | PIC1 | J | 10 | A | 10 |
| 317 | J | J | A | SCAT2 | K |
| 318 | Q | A | DYNSCAT | 9 | A |
| 319 | K | PIC2 | PIC2 | 9 | J |
| 320 | A | PIC3 | Q | PIC2 | PIC3 |
| 321 | PIC1 | 9 | A | PIC1 | DYNSCAT |
| 321 | A | PIC3 | J | WILD | 10 |
| 323 | J | DYNSCAT | J | PIC3 | J |
| 324 | Q | Q | DYNSCAT | Q | Q |
| 325 | PIC2 | Q | 9 | A | PIC3 |
| 330 | ... | ... | ... | ... | ... |

*FIG. 3*

GAMING DEVICE WITH WHEELS FOR AWARDING COMPOSITE FEATURES

RELATED APPLICATIONS

The present application claims priority to Australian Patent Application No. AU 2022204451, filed on Jun. 23, 2022, and also claims priority to Australian Patent Application No. AU 2021903149, filed on Oct. 1, 2021, and also claims priority to Australian Patent Application No. AU 2021903283, filed on Sep. 27, 2021, all which are hereby incorporated by reference in their entireties.

FIELD

The present application relates to an electronic gaming machine, a method of operating an electronic gaming machine, and an electronic gaming system.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Gaming systems or devices may allow players to win awards. The awards may be determined based on predefined volatility criteria or return-to-player. Yet technical problems exist involving how a gaming device may satisfy a designated game return-to-player that either complies with applicable regulations for certain game features or is set to achieve a certain game volatility, where the gaming device involves a single window game instance converted to multiple window game instances based on random outcomes, with persistent game symbols and increasing the numbers of ways to win based on bet sizes. To meet or satisfy a target volatility criterion or designated RTP, the random nature of a game determination may, in a such a game conversion configuration with increasing the number of game instances in display windows, in turn and for example, drive a game device to overprocess and generate numerous game outcomes in the background for each display window before determining and displaying a game outcome to a player that satisfies the target volatility criterion or designated RTP for the designated jurisdiction.

Repeated determination of whether each of the numerous game outcomes yields the designated volatility each time the game is played may be an inefficient, and a time and resource consuming process. Additionally, the confined screen size of many gaming devices creates challenges as to how game changes and related information are effectively communicated to the viewer.

SUMMARY

There is disclosed an electronic gaming machine, a method of operating an electronic gaming machine and an electronic gaming system where during a spinning reel game, a wheel feature can be initiated separately to the spinning reel game in which a plurality of wheels are spun, each of which can result in an award of a feature game. If more than one feature is awarded, a composite feature is conducted that comprises game play characteristics of each awarded feature.

An example embodiment describes an electronic gaming machine comprising a display device, a random number generator, a processor, and a memory storing instructions which, when executed by the processor, cause the processor to, in response to a feature wheel initiation condition being met: select, based on one or more random numbers dynamically generated by a random number generator, stopping positions for a plurality of feature wheels, each of the feature wheels being associated with a different feature event corresponding to a spinning reel, and each of the feature wheels comprising a plurality of outcomes at different stopping positions, wherein at least one of the different stopping positions of each of the feature wheels corresponds to an outcome comprising a feature event associated with each of the feature wheels; control the display device to display spinning of the plurality of feature wheels to the stopping positions selected; determine, based on the stopping positions selected, whether to provide an outcome from the plurality of outcomes from each of the feature wheels; and upon determining to provide more than one outcome comprising the feature event, initiate a composite feature event comprising characteristics of each of the feature events resulting in only a single feature event being initiated from the spinning of the plurality of feature wheels, wherein the composite feature event animates special effects on the display device.

Another example embodiment describes a non-transitory computer readable medium for conducting a feature event on a system including a display device, a controller, and one or more sequences of instructions which, when executed, cause the controller to perform the steps of: selecting, based on one or more random numbers dynamically generated by a random number generator, stopping positions for a plurality of feature wheels, each feature wheel associated with a different feature event of a spinning reel, each feature wheel comprising a plurality of outcomes at different wheel positions, and each feature wheel being dynamically displayed at a scale corresponding to a number of active feature wheels, wherein at least one wheel position of each wheel corresponds to an outcome of the feature event associated with each feature wheel; controlling the display device to display spinning of the plurality of feature wheels to the selected stopping positions; determining based on the selected stopping positions, whether to display an outcome from each wheel on the display device; and upon determining to make more than one outcome comprising a feature event, display a composite feature event comprising characteristics of each of the displayed feature events so that only a single feature event is graphically provided via visual effects on the display device.

Another example embodiment describes an electronic gaming system comprising: at least one display device; a random number generator; one or more processors; and at least one memory storing instructions which, when executed by the one or more processors, cause the one or more processors to, in response to a feature wheel initiation condition being met: select, based on one or more random numbers dynamically generated by a random number generator, stopping positions for a plurality of feature wheels, each feature wheel associated with a different feature event of a spinning reel, and each feature wheel comprising a plurality of outcomes at different wheel positions, wherein at least one wheel position of each feature wheel corresponds to an outcome of the feature event associated with the feature wheel; control the display device to display spinning of the plurality of feature wheels to the respective selected stopping positions; determine based on the selected stopping positions, whether to provide an outcome from each wheel; and upon determining to make more than one outcome comprising the feature event associated with the feature wheel, animate, on the display device, a composite feature event comprising enhanced and unenhanced characteristics of each provided feature event so that only a single feature event is graphically displayed.

BRIEF DESCRIPTION OF THE DRAWINGS

FIG. 3 illustrates an example reel strip layout.

DETAILED DESCRIPTION

Figure 1:
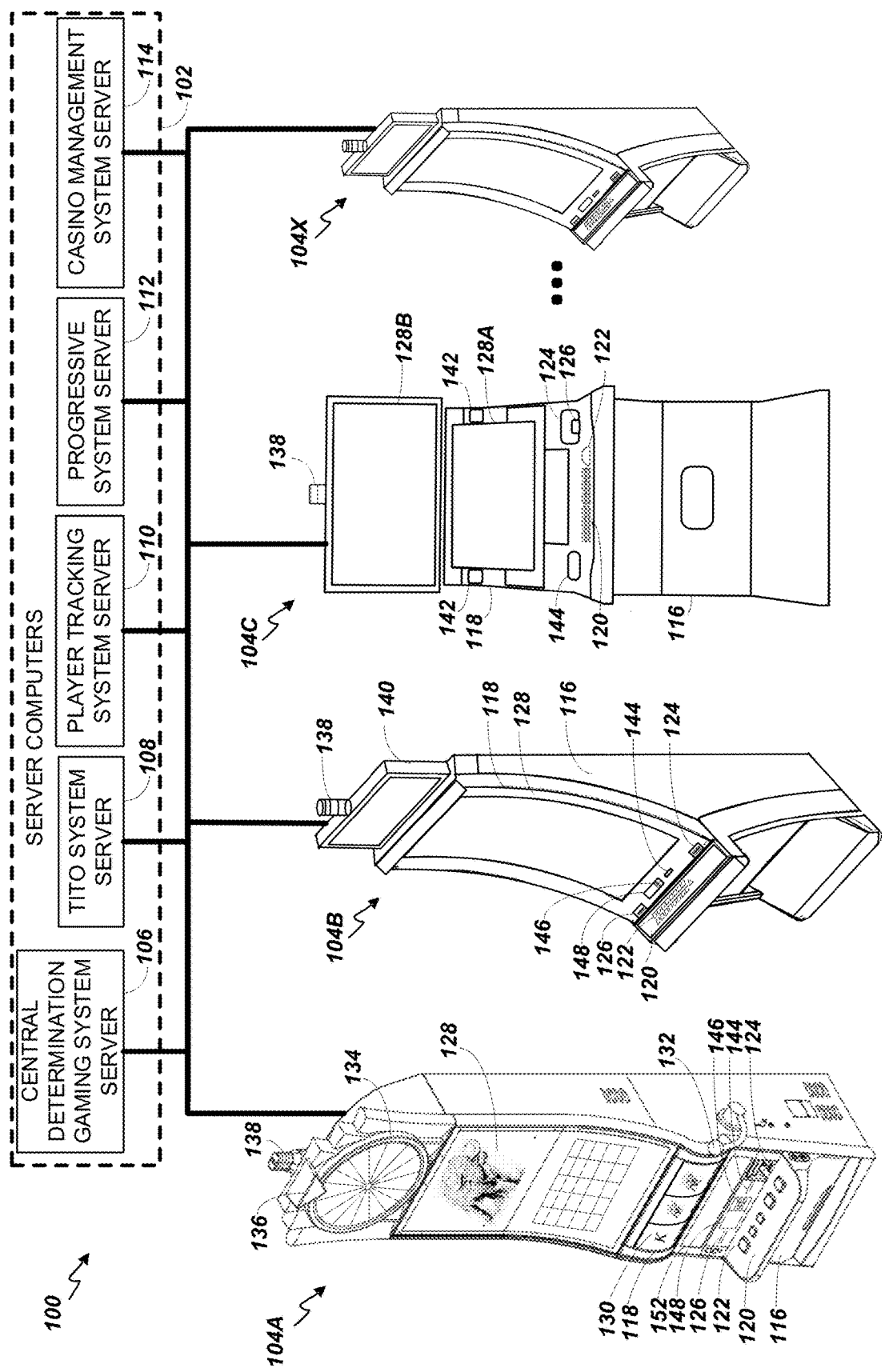
FIG. 1 is an exemplary diagram showing several EGMs networked with various gaming related servers.

Embodiments of the present disclosure represent a technical improvement in the art of electronic gaming machines, devices, systems, and operation of such electronic gaming machines, devices, or systems. Some embodiments of the present disclosure include an improved electronic gaming machine that dynamically configures a composite feature game based on a first feature game and a second feature game by employing special enhanced play characteristics.

However, game design challenges arise when implementing composite feature games with both enhanced and unenhanced play characteristics across feature games. That is, technical challenges occur, and have to be overcome, when unenhanced play characteristics and enhanced play characteristics are combined in a composite feature game, because the enhanced characteristics risk potential high payouts that exceed the allowable RTP. These challenges require realization of gaming machine processing configuration to control enhanced play characteristics across feature games due to changing volatility and to achieve a predetermined RTP for different feature games.

More specifically, by way of example, exemplary embodiments of the present disclosure improve the technical capability of the electronic gaming machines, devices, and systems. An enhanced technical capability may be accomplished by controlling the processor to provide boosts when metamorphic bags are at their highest states, where a processor is driven to perform a sequence of instructions involving multiple individual feature games and different game states stored in a memory based on a defined trigger probability associated with each of the feature games, including a composite feature game, and assigned ranges of values returnable in conjunction with a random number generator to trigger one or more of the feature games, for example. In general, embodiments of the present disclosure dynamically configure a composite feature game from individual feature games with individual game characteristics and their respective game states when the composite feature game is triggered, while still achieving a predetermined volatility or a predetermined RTP to comply with jurisdictional regulations.

Technical challenges exist in adding a plurality of feature combinations to accommodate both additional unenhanced states and additional enhanced states across feature games that include composite feature games. For example, unlike other games that typically include a number of feature combinations based only on the number of base game features available, improvements in the gaming machine technical capability facilitate use of additional states based on both enhanced states and unenhanced states of the feature games. For example, while there may be seven possible feature combinations for three different feature games for other combination features, the instant disclosure may include twenty-six possible feature combinations for three different feature games with unenhanced states and enhanced states. In such embodiments, twenty-six different feature combinations are changed. For example, changes may include how often or frequencies they are won, what the expected payouts are, and ensuring that "boosted" variants of the feature reliably paid more than non-boosted variants. This expands the game machine capability.

Additionally, unlike other games where points, credits, or states achieved in a game do not affect play characteristics of a combined feature game, in some embodiments of the present disclosure, the points, credits, or states achieved in a game adversely may affect how a composite feature game is played, and particularly, how the volatility is determined. For example, in some embodiments, the improvement in gaming machine capability occurs through operational advantages in, among other things, configuring a triggered feature game by processing dynamically to allow the coins accumulated, counted or monitored to trigger or activate an enhanced feature, to determine a number of reel spins to collect the coins required to activate the enhanced feature, to change weight tables and/or reels for determining wins and/or awards, and to determine additional payout or award dynamically when the enhanced feature is reached.

Challenges so occur in steady state feature game progressions. Improvements in game machine capability occur with embodiment of the present invention through recognition of the advantage of employing game processing to control the speeds or metamorphic progression at which feature games are transitioning or progressing from a current state to a higher state or a highest state, while achieving the RTP and game volatility. As such, in some embodiments, the metamorphic progression or speed may be controlled, for example, such that higher paying variations will access higher states quicker. In other embodiments, the metamorphic progression or speed may be controlled by having more states such that the transition from a lower state to the highest state may take longer. In yet other embodiments, the metamorphic progression or speed may be controlled, for example, such that higher paying variations will access higher states slower.

Additionally, an improvement in the graphical user interface of the game machine is achieved by employing a composite feature game that may, concurrently or subsequently, function to animate special effects on a display in response to one or more of the feature games being initiated based on a metamorphic progression. Such graphical effects on the display efficiently use the available fixed-size display screen of the gaming machine or device to visually communicate enhanced game play characteristics and outcomes, while still accommodating presentation and appreciation of traditional gaming visual effects, e.g., a base game, and credits, etc. Such a display allows the player to rapidly appreciate and understand visually the graphical effects game progress, award differences and gaming actions to be taken without being overly burdened by complicated visual presentation and mathematical calculations. The enhanced display, in turn, provides improved game interaction and anticipation characteristics for the player and provide more varied game outcomes. Thus, embodiments of the present disclosure are not merely new game rules or simply new display patterns, but provide technologic improvements to computer and gaming capabilities and graphical user interfaces in the technical art of electronic gaming machines.

The above example is not intended to be limiting, but merely exemplary of technologic improvements provided by some embodiments of the present disclosure. Technological improvements of other embodiments are readily apparent to those of ordinary skill in the art in light of the present disclosure.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
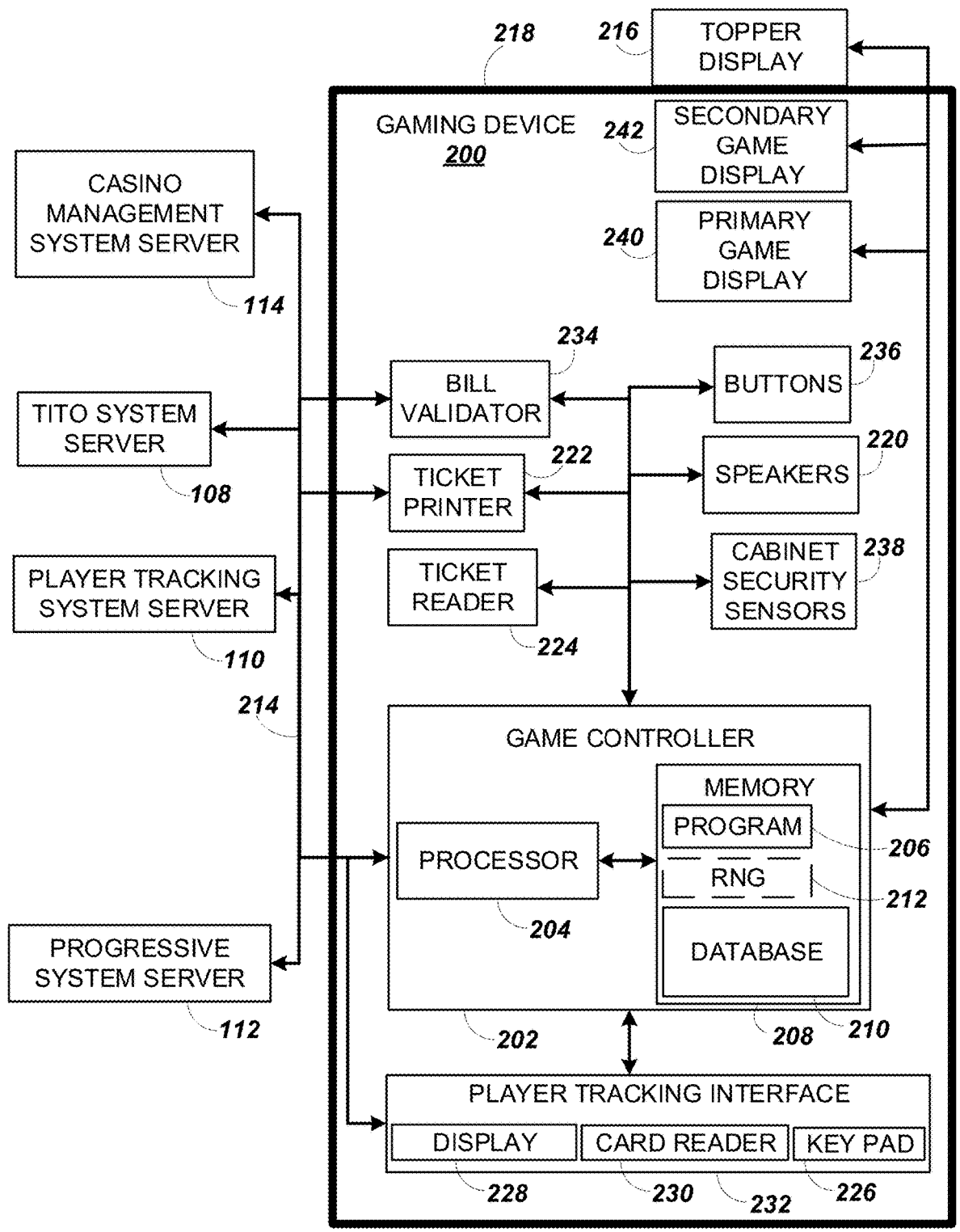
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display) and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5A:
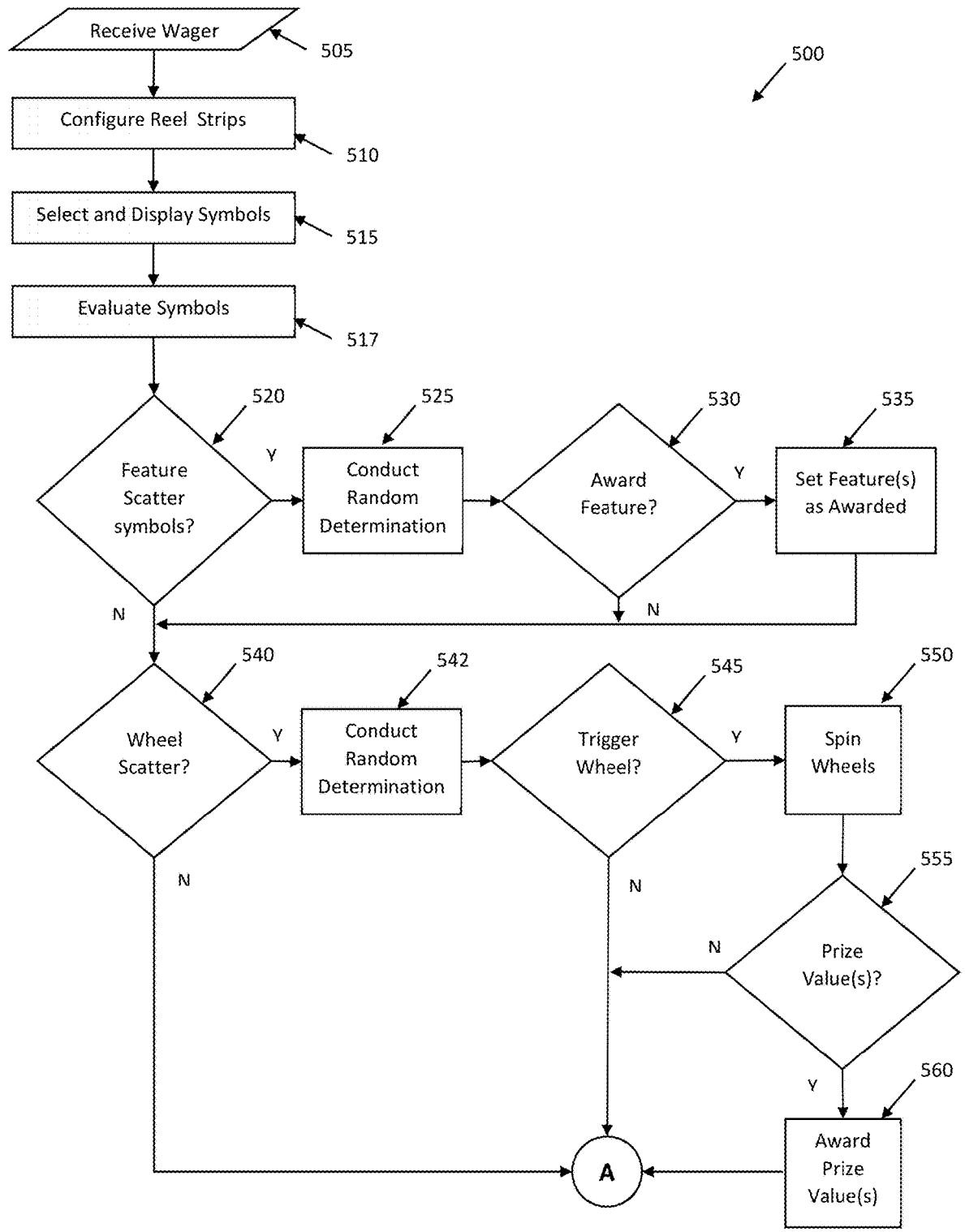
FIGS. 5A and 5B show a flow chart of a method of operating an electronic gaming machine.
Figure 5B:
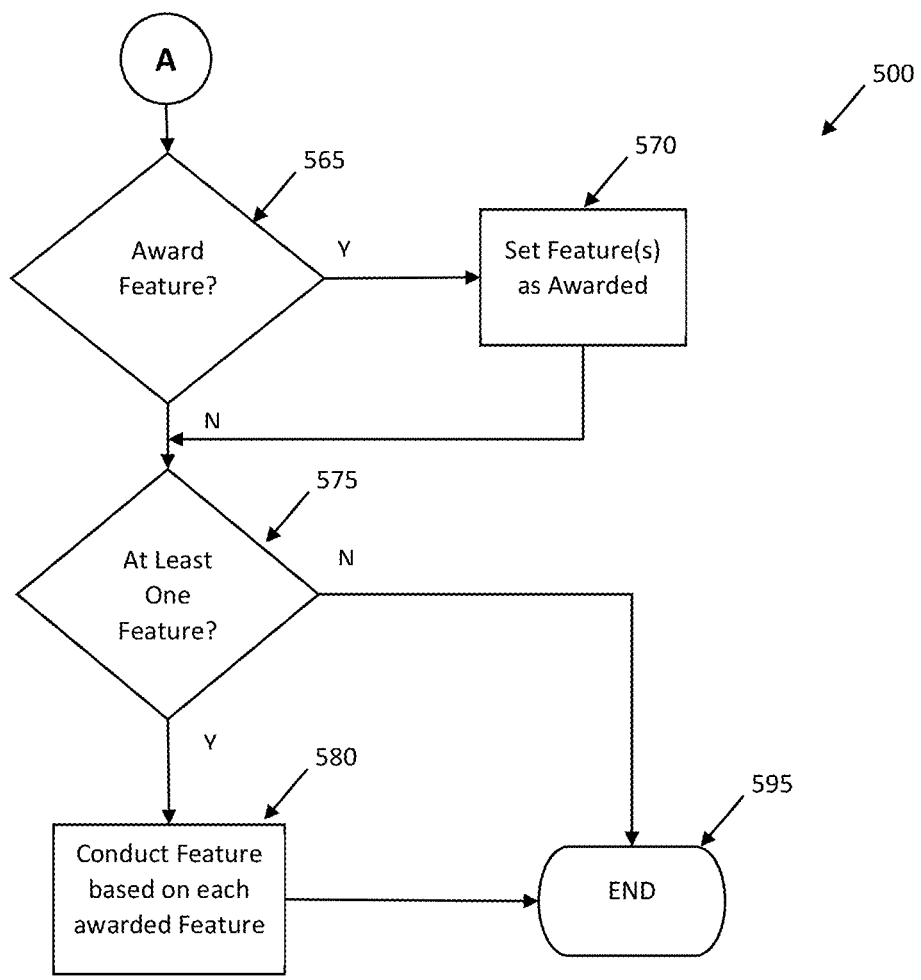

FIGS. 5A and 5B show a flow chart of an example embodiment of a method 500 of operating a gaming device. At step 505, the processor 204 initiates a first game instance (e.g. a base game) in response to receiving a wager (e.g. in response to a player making a wager selection using buttons as described above).

At step 510, the processor 204 configures the reel strips for a current game instance. In this respect, FIG. 3 illustrates an example of a set 300 of five reel strips 341, 342, 343, 344, 345. In the example, for illustrative purposes, twenty-five reel strip positions 301-325 are shown for each reel strip 341-345. Each reel strip position of each reel has a symbol. For example, a "Wild" symbol occupies the twenty-first reel strip position 321 of the fourth reel 344. The symbols shown on the reel strip are generally indicative of symbols that may be employed in the embodiments; however, reels strips other than those illustrated in FIG. 3 can be used. For example, two or more wild symbols can be placed at consecutive reel strip positions of a reel strip. Symbol position 330 indicates that the reel strips 341-345 may have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the lengths of the stacks, the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another.

The reel strips 341-345 have dynamic scatter symbols ("DYNSCAT"), for example at the sixth reel strip position 306 of the first and second reel strips 341, 342. At step 510 the processor 204 uses values returned from random number generator 212 to individually select scatter symbols from a set of scatter symbols based on weightings set out in a weight table as exemplified in Table 1 below.

TABLE 1

| Scatter Symbol | Weighting |
|---|---|
| SCAT1 | Weighting 1 |
| SCAT2 | Weighting 2 |
| SCAT3 | Weighting 3 |
| WHEEL SCATTER | Weighting 4 |

Each of the first to third scatter symbols (SCAT1, SCAT2, SCAT3) are associated with specific feature games while the Wheel Scatter is associated with an advantageous mechanism for awarding a feature game described in further detail below. In an example embodiment, the weightings are preset based on the desired relative probability of the scatters appearing which, in turn, is related to the frequency of specific features occurring and the return to player from the respective features. ("SCAT" is an abbreviation for "scatter" and is indicative of the fact that it does not matter at which symbol positions the "SCAT" symbols are selected.)

Figure 6:
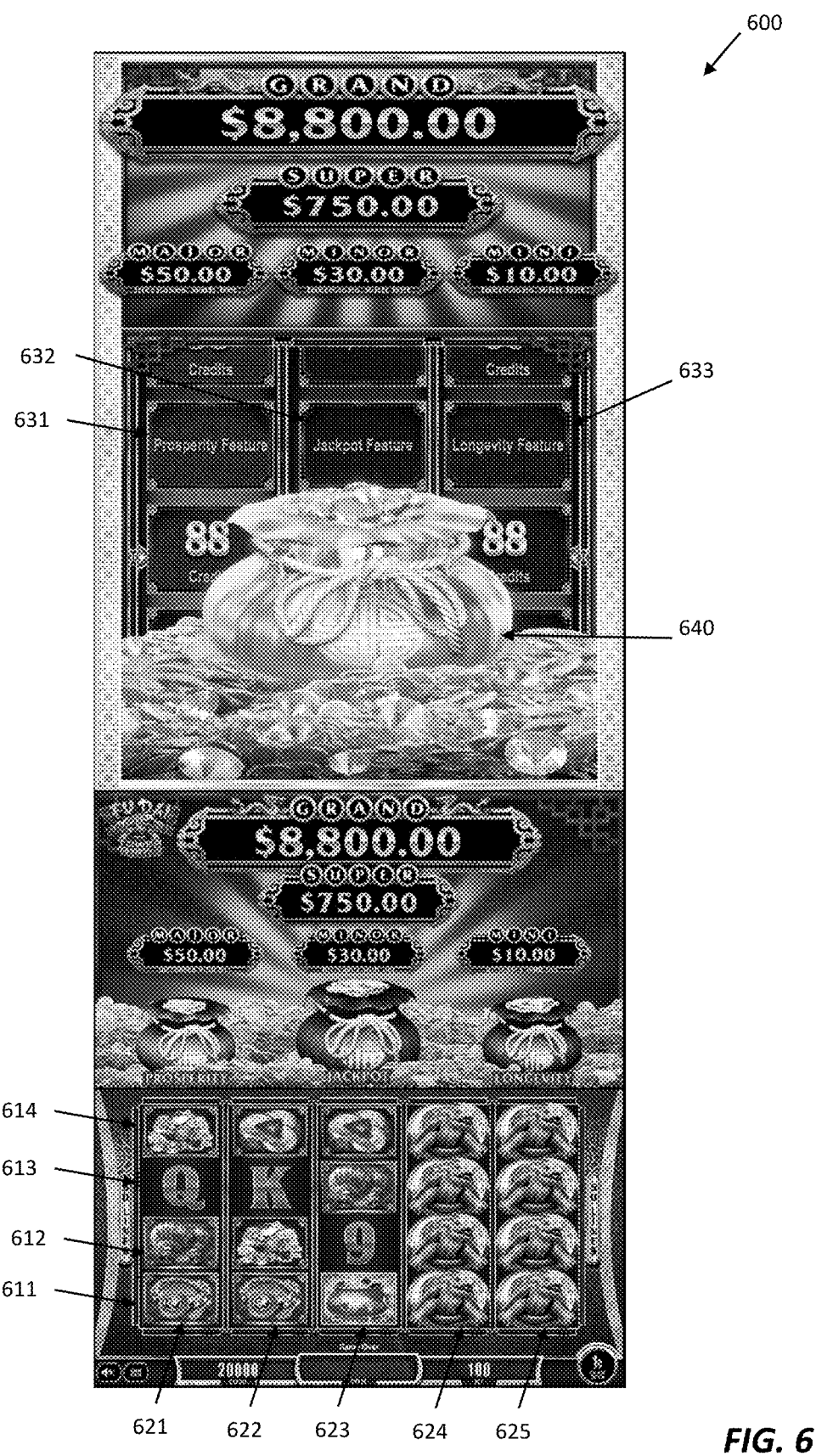
FIGS. 6 to 17 are exemplary screen displays.

At step 515, the processor 204 selects symbols for a spinning reel game and controls the display 240 to display the selected symbols. FIG. 6 shows an example screen display 600 of a base game (a first game instance) where symbols are selected from five reel strips for display in five columns of symbol positions 621-625 with four symbols being selected from each reel strip such that there are also four rows 611-614 of symbol positions in a first display area. In a second display area above the first display area, there are three wheels 631-633 carrying prizes. Wheels 631-633 are obscured by bag of gems 640 to indicate that they are inactive.

Figure 4:
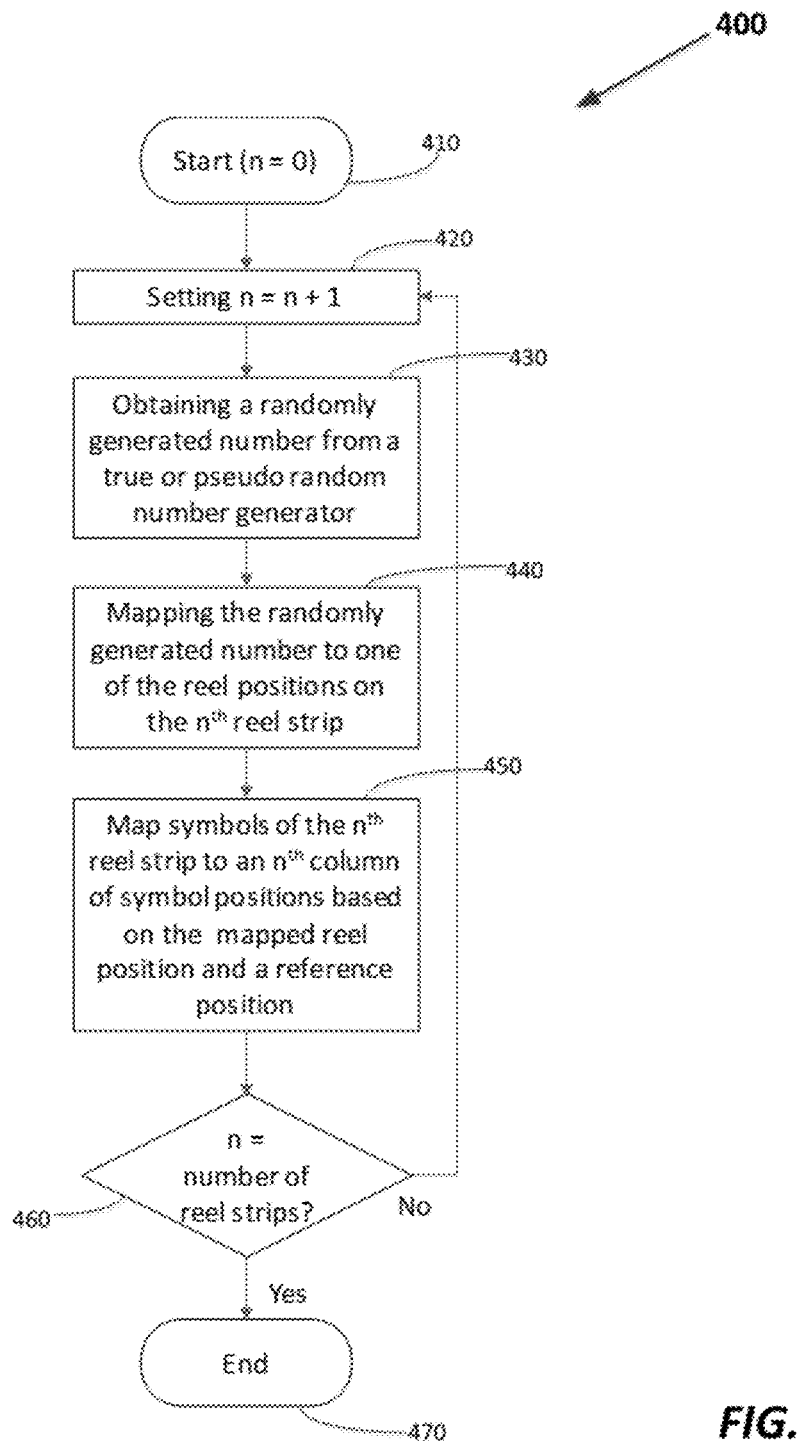
FIG. 4 is a flow chart of a symbol selection method.

FIG. 4 is a flow chart of an example method 400 carried out by the processor 204 to select symbols from reel strips at step 510. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. That is, the symbol positions in bottom row 611. In this example, the selected reel position (and hence the symbol at this position) is mapped to the bottom symbol position of the column. Referring to the example reel strips of FIG. 3, if the value returned by the RNG 212 is mapped to reel position 313 when four symbols are being selected from each reel as shown in FIG. 6, then for the first reel strip 341, "10" is mapped to a first, bottom symbol position, "10" symbol 342 is mapped to a second symbol position, "SCAT2" symbol 343 is mapped to a third symbol position, and "A" symbol is mapped to a fourth, top symbol position.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. In other example, different numbers of symbols may be mapped to different numbers of symbol positions.

After the symbols are selected, at step 515, the processor 204 evaluates the selected symbols at step 517 for one or more winning combinations based on a pay table stored in memory. In this example, processor 204 applies a "play lines" type evaluation by processing the selected symbols to identify instances of the same symbol appearing on pay lines defines in memory 208. Upon there being one or more winning combinations, the processor 204 makes an award for each winning combination based on any selected bet multiplier, for example, by adding credit amounts defined by the pay table to a meter such as a win or credit meter in memory 204.

Processor 204 then conducts a number of processes 520-580 to determine if an individual feature game or a composite feature game should (or should not) be initiated based on the selected symbols. As described above, in an example, the reel strips may be configured with SCAT1, SCAT 2, and SCAT3 or WHEEL SCATTER symbols.

When SCAT1, SCAT2, SCAT3 and/or WHEEL SCATTER are selected (or "appear on the window"), there is a weighted chance the associated feature is triggered.

A total of 8 weight tables are stored in the memory, one for each possible combination of SCAT1, SCAT2 or SCAT3 symbols landing and a separate weight table for WHEEL SCATTER.

That is, the selection of a respective scatter symbol SCAT1, SCAT2 or SCAT3 at step 515 results in a chance of triggering the associated a feature game (Ft1, Ft2 & Ft3). Where more than one trigger symbol is selected, in addition to there being a chance of triggering the respective feature game, there is a chance of triggering features that combine game play characteristics of the individual feature games which are combined to form composite features (Ft 1+2, Ft 1+3, Ft 2+3, Ft 1+2+3). Whether a single feature or composite feature is triggered depends on a weight table. An example of seven weight tables is set out in Table 2 below:

TABLE 2

|  | Ft1 | Ft2 | Ft3 | Ft (1 + 2) | Ft (1 + 3) | Ft (2 + 3) | Ft (1 + 2 + 3) | None | (sum) |
|---|---|---|---|---|---|---|---|---|---|
| Scat 1 | 0.5 | 0 | 0 | 0 | 0 | 0 | 0 | 0.5 | 1 |
| Scat 2 | 0 | 0.5 | 0 | 0 | 0 | 0 | 0 | 0.5 | 1 |
| Scat 3 | 0 | 0 | 0.5 | 0 | 0 | 0 | 0 | 0.5 | 1 |
| Scat 1 & 2 | 0.2 | 0.2 | 0 | 0.1 | 0 | 0 | 0 | 0.5 | 1 |
| Scat 1 & 3 | 0.2 | 0 | 0.2 | 0 | 0.1 | 0 | 0 | 0.5 | 1 |
| Scat 2 & 3 | 0 | 0.2 | 0.2 | 0 | 0 | 0.1 | 0 | 0.5 | 1 |
| Scat 1 to 3 | 0.1 | 0.1 | 0.1 | 0.08 | 0.04 | 0.04 | 0.04 | 0.5 | 1 |

At step 520, processor 204 determines whether the selected symbols include one or more scatter symbols and if they do, processor 204 proceeds to step 525 in order to conduct a random determination to determine whether to award one or more features. In this example, at step processor 204 selects the weight table based on the identity of the trigger symbols included in the selected symbols. That is, processor 204 also uses the identity of the trigger symbol(s) to select a set of one of the weight tables of Table 2 and hence select trigger probabilities for the random determination. In this respect, it will be appreciated that this process can be initiated before or after the symbols are displayed. In this respect, referring to Table 2, in an example, where only a SCAT 1 is selected, processor 204 determines that a trigger probability of 0.5 applies to triggering the first feature game (Ft1), and hence there is a probability of 0.5 that no feature will trigger. In another example, where each of SCAT 1, SCAT 2, and SCAT 3 are selected, a trigger probability of 0.1 applies to triggering a first feature game, a trigger probability of 0.1 applies to triggering a second feature game, a trigger probability of 0.1 applies to triggering a third feature game, a trigger probability of 0.08 applies to a first composite feature game having characteristics of the first and second feature games, a trigger probability of 0.04 applies to a second composite feature game having characteristics of the first and third feature games, a trigger probability of 0.04 applies to a third composite feature game having characteristics of the second and third feature games, and a trigger probability of 0.04 applies to a fourth composite feature game having characteristics of the first, second and third feature games.

Based on the trigger probability or probabilities, the processor 204 assigns ranges of values returnable by RNG 212 to the respective feature games. The processor 204 determines a trigger outcome based on the trigger probability or probabilities by obtaining a value from RNG 212 and comparing the returned value to the assigned ranges. If the returned value corresponds to one of the assigned ranges, the outcome is that the processor 204 awards the relevant feature game. In the example, of Table 2, a possible outcome for all combinations of trigger symbols is that no feature game is triggered.

It will be appreciated that in another example, the weight tables may associate ranges of values returnable from the RNG 212 with specific outcomes rather than specifying probabilities.

Australian Patent Application No. 2019236613 filed 23 Sep. 2019 and entitled "GAMING DEVICE WITH MULTIPLE TRIGGERABLE FEATURE GAMES", the disclosure of which is incorporated herein by reference, describes this mechanism of using multiple scatter symbols to trigger feature games in more detail.

At step 530, the processor 204 determines whether the outcome of step 525 is to award one or more features and upon making a positive determination sets the feature or features as awarded at step 535.

Figure 7:
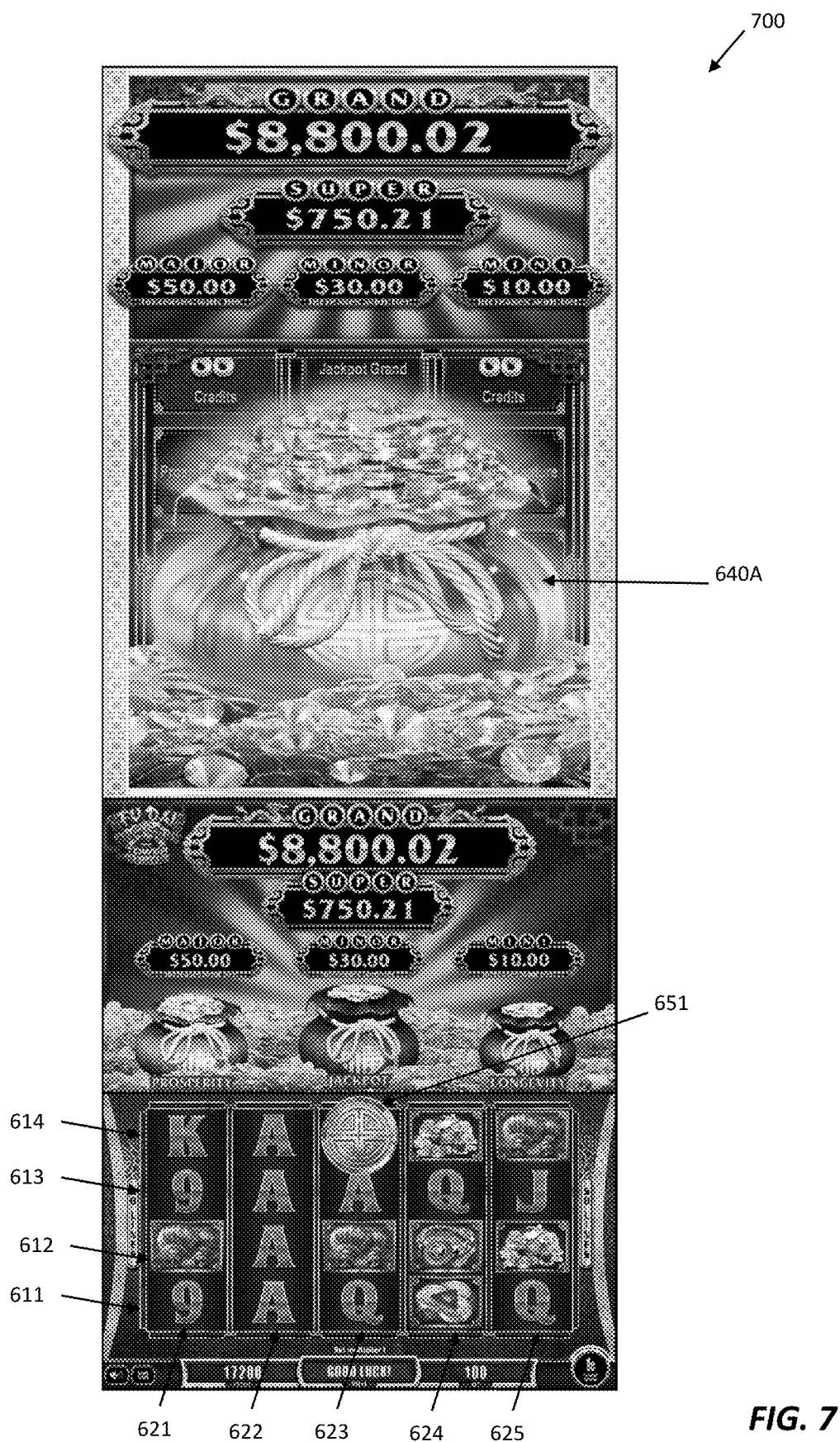

As indicated above, WHEEL SCATTER has its own weight table to determine if the Wheel Feature is triggered or not. FIG. 7 shows an example screen display 700 where a WHEEL SCATTER symbol 651 has been selected at the top position of the third column 623. Accordingly, in this example, at step 540, processor 204 will make a positive determination at step 540 that the selected symbols include WHEEL SCATTER and proceed to conduct a random determination at step 542 based on the WHEEL SCATTER weight table using values returned from the random number generator 212. Processor 204 animates bag of gems to an excited state 640A to indicate that a WHEEL SCATTER has landed.

Figure 8:
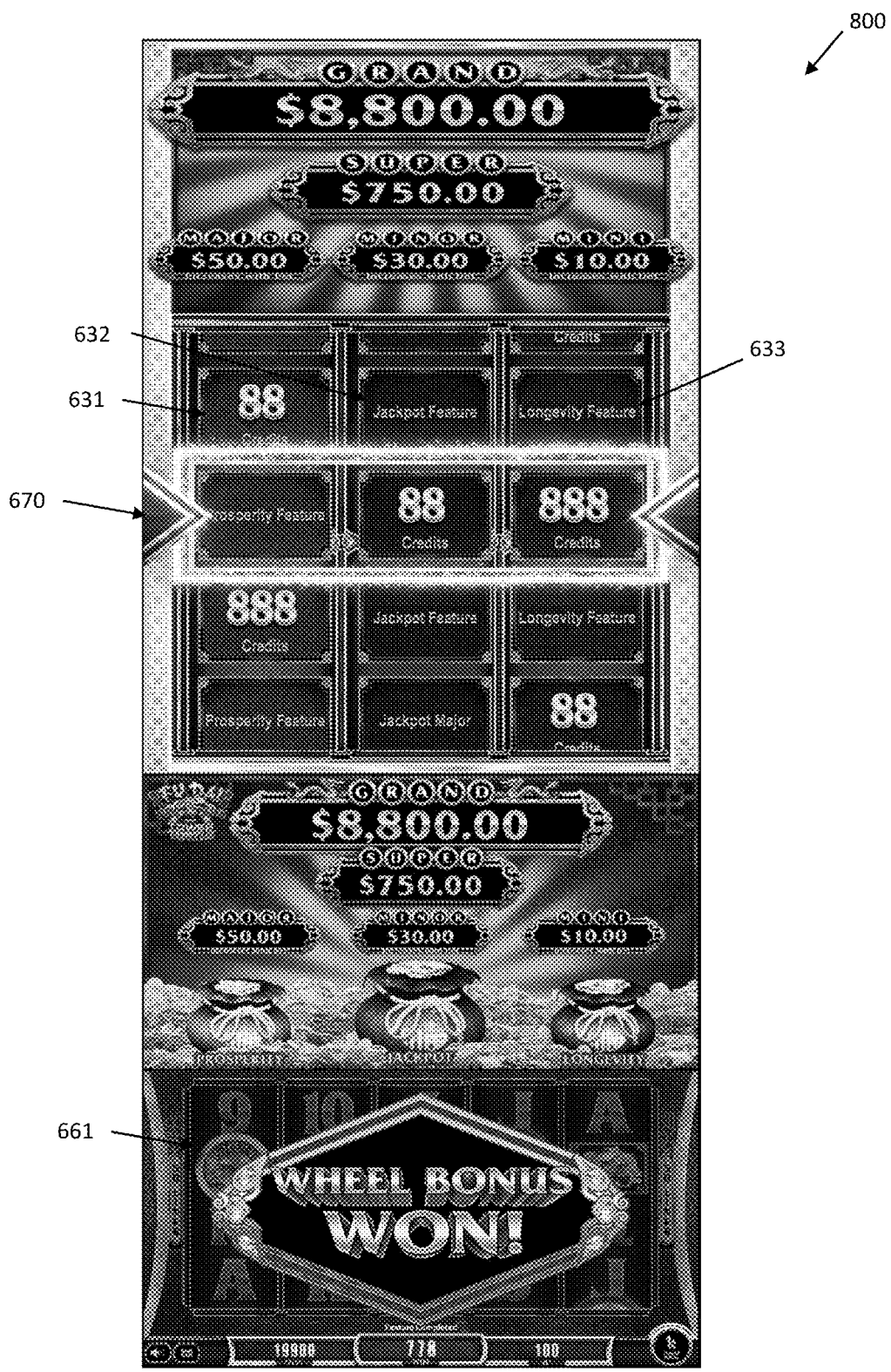

At step 545 processor determines whether to trigger the Wheel Feature based on the outcome of the random determination. FIG. 8 shows an example screen display 800, where processor 204 makes a positive determination at step 5445 and controls the display 204 to display an award message 661 indicating "Wheel Bonus Won!". Processor 204 also removes the gem bag 640 to reveal the wheels 631-633 and indicate they are active. Processor 204 also adds reference indicator 670 to indicate where the award from the Wheel Feature will be indicated.

As shown in FIG. 8, each wheel 631-633 has a plurality of awards such as credit prizes, bonus prizes, and a feature award. The first wheel 631 can award the "Prosperity Feature", the second wheel 632 can award the "Jackpot Feature" and the third wheel 633 can award the "Longevity Feature". Each of the features are described in further detail below.

Figure 9:
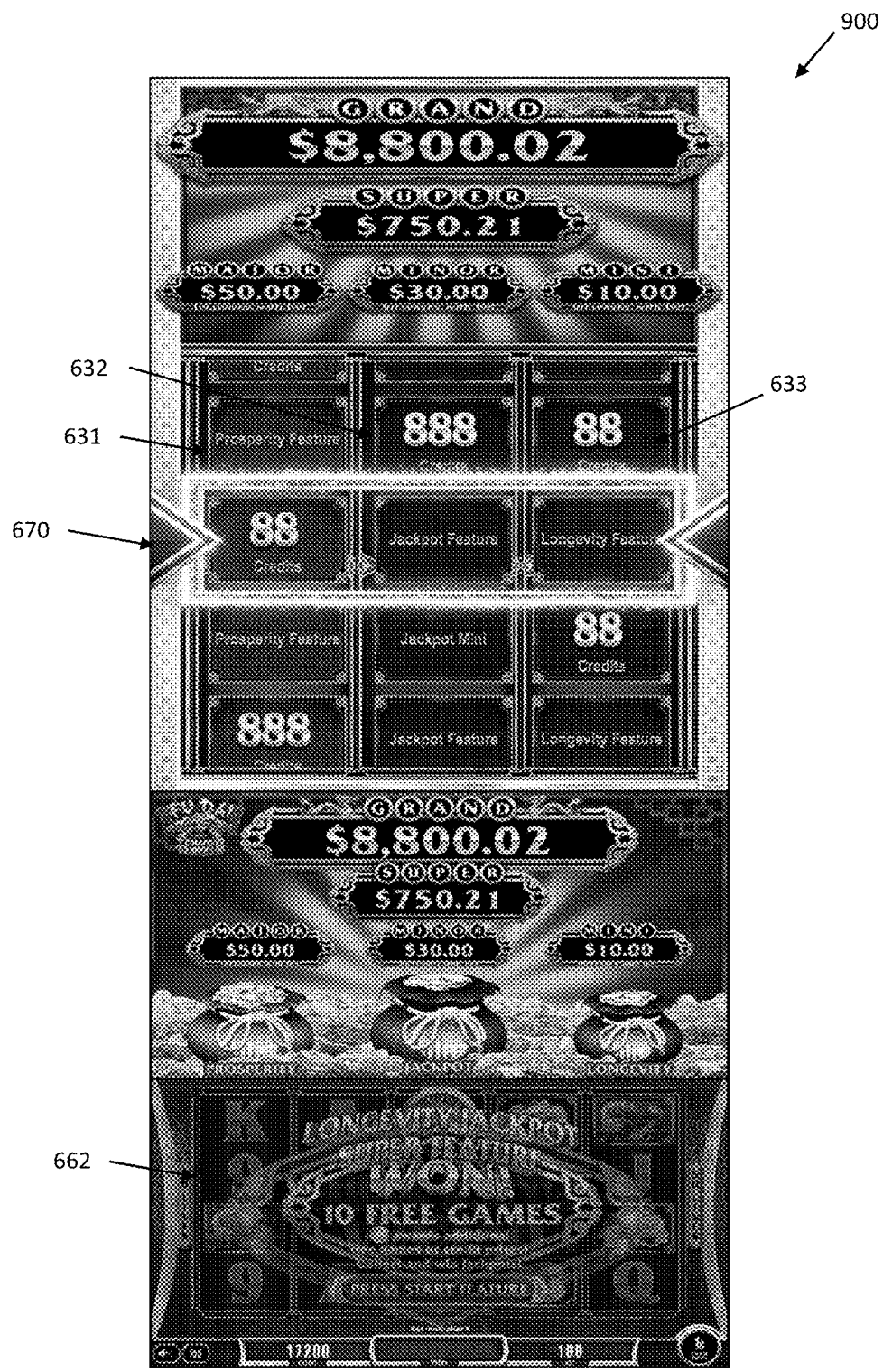
Figure 10:
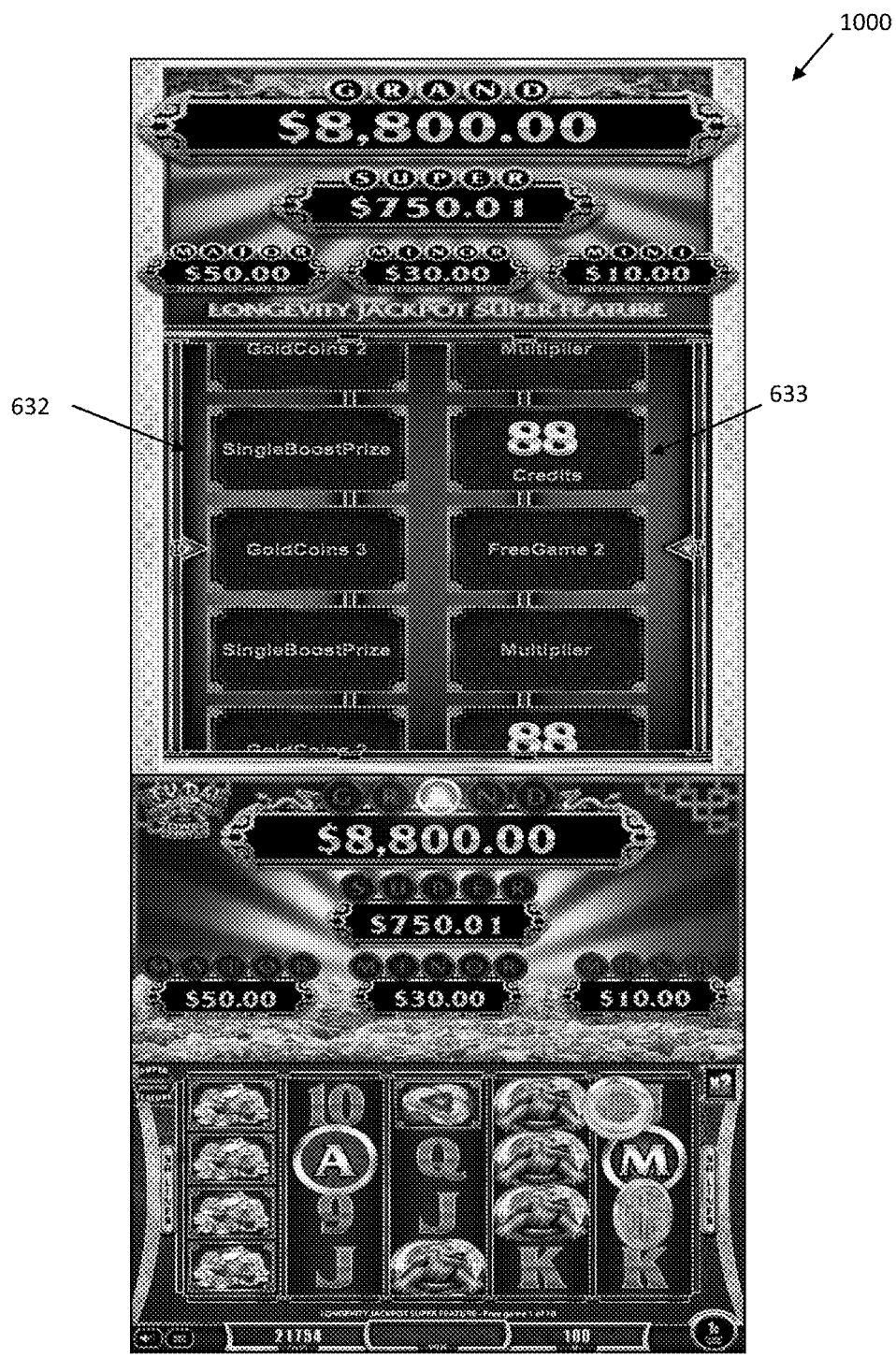

In this example, processor will proceed to step 550 and spin the wheels; that is processor 204 randomly selects stopping positions for the wheels in a manner analogous to selecting symbols from reel strips as described in relation to FIG. 4 above. Processor 204 controls an animation of spinning of the wheels to the stopping position. An outcome of this process is shown in the example screen display 900 of FIG. 9. In FIG. 9, an award of "88 credits" has been made from the first wheel 631, an award of the "Jackpot Feature" is made from the second wheel 632 and an award of the "Longevity Feature" is made from the third wheel.

Accordingly, in this example, at step 555 processor 204 will determine that there is a prize value to award and will proceed to step 560 and award the prize value (here 88 credits) by adding it to a win meter or credit meter in memory 208.

Processor 204 then proceeds to step 565 as shown in FIG. 5B and will make a positive determination that a feature has been awarded at step 565 and will set the features as awarded at step 570. Processor 204 will also make a positive determination at step 575 that at least one feature has been awarded and hence proceed to step 580 and conduct a feature based on all awarded features before the process ends at step 595. In the example, the outcome shown in the screen display 900 of FIG. 9 results in an award of the Longevity Jackpot Super Feature (composite feature) as indicated by award message 661 which states "Longevity Jackpot Super Feature Won! 10 Free Games." [GOLD SCAT] symbol awards additional free games or credit prizes! Collect and win jackpots!". Accordingly at step 580, processor transitions to a screen display 1000 corresponding to award of the Longevity Jackpot Super Feature.

It will be appreciated that the wheel feature mechanism for triggering a composite feature can be implemented by a gaming device 200 that implements feature games having different characteristics and that the following examples are non-limiting. Further, in some examples, the wheel feature mechanism may be the only mechanism for triggering the feature games and/or the wheel feature mechanism and scatter mechanism are arranged so as not to occur in the same game instance. In some example, the wheels may have one or more blank positions that do not result in an award.

Feature 1 (Reel Growth and Nudge Wilds)—The "Prosperity Feature"

Feature 1 is triggered based on a random chance when SCAT1 appears on the reels (or through wheel feature). Five free games (game instances are awarded). The symbol positions for which symbols are selected or "window" grows to 6 symbol positions high and 100 lines are played—i.e. two symbol positions are added. If a WILD symbol appears in any position on reels 2, 3 4 and/or 5, the reels are nudged so that all symbols on that reel become WILD. All wins are paid after the reels have been nudged. One or more other feature(s) may be triggered during Feature 1.

In this respect, if one or more further features are triggered during conduct of a previously awarded feature by processor 204, the state of the relevant feature is set to triggered, and at the end of the feature being conducted, an award is made of a feature corresponding to the feature or features that were accumulated during the feature game. That is, the features are set as awarded in a manner analogous to that described above. Further detail of this process is provided in Australian Patent Application No. 2019232942 filed 20 Sep. 2019 and entitled GAMING DEVICE WITH RETRIGGERABLE COMPOSITE FEATURE GAME, the disclosure of which is incorporated herein by reference.

Feature 2 (Additional Games and Multipliers)—The "Longevity Feature"

Feature 2 is triggered based on a random chance when SCAT2 appears on the reels (or through wheel feature). Five free games (game instances) are awarded. Every SCAT2 that appears during the game instances awards one additional free game, two free games or a bonus credit prize. Selections of the award for a SCAT2 are made from a weight table without replacement. A multiplier is applied to all line wins during the feature. In an example, the value of the multiplier is 3. One or more other feature(s) may be triggered during Feature 2.

Feature 3 (Jackpot Feature)—The "Jackpot Feature"

Feature 3 is triggered based on a random chance when SCAT3 appears on the reels (or through wheel feature). 10 free games are awarded. SCAT1, SCAT2 and SCAT3 are replaced by GOLD SCAT during this feature. Each GOLD SCAT appearing reveals a wheel spin as described in further detail below, a credit prize or a letter "M" "I" "N" "A" "J" "O" "R" "G" "N" "D" "S" "U" "P" "E" on the symbol determined via a series of weight tables. In this respect, these letters correspond to the words GRAND, SUPER, MAJOR, MINOR and MINI which correspond to 5 jackpots with names: GRAND, SUPER, MAJOR, MINOR and MINI.

A first weighted table determines which secondary table is used from among GRAND/SUPER/MAJOR/MINOR/MINI/WHEEL tables. The processor 204 selects from each of these tables without replacement and each contains a set of "undetermined" letters as well as credit prizes. E.g. the "GRAND" table, contains reference letters "Grand_1, Grand_2, Grand_3, Grand_4 and Grand_5" each with a unique weight.

At the start of each jackpot feature, these reference letters will randomly (even chance) be assigned a letter corresponding to the jackpot level by processor 204. E.g. "Grand_1, Grand_2, Grand_3, Grand_4 and Grand_5" will be randomly assigned "G, R, A, N or D" for the remainder of the feature.

If a letter appears on the reels, it is counted towards spelling one of the jackpot names. When the name of the jackpot is completely collected, the respective jackpot is awarded.

After the jackpot is awarded, the jackpot name is reset and may be triggered again during the remainder of the feature. Weight tables are reset if all prizes within the weight table have been awarded. Further features cannot be triggered during this feature except the Wheel Feature.

Super Feature 1 (Feature 1+Feature 2)

If a SCAT1 and SCAT2 feature are simultaneously awarded, Super Feature 1 is awarded. In this example, 5 free games are awarded. The window grows to 6 symbol positions high and 100 lines are played. If WILD appears in any position on reels 2, 3 4 and/or 5, the reels are nudged so that all symbols on that reel become WILD (a characteristic of Feature 1). Every SCAT2 that appears during the feature awards 1 free game, 2 free games or a bonus credit prize (a characteristic of Feature 2). Selections are made from a weight table without replacements. A multiplier is applied to all line wins during the feature. In an example, a value of the multiplier is 3 (another characteristic of Feature 2). Feature(s) may be triggered again during the feature.

Super Feature 2 (Feature 1+Feature 3)

If a SCAT1 and SCAT3 feature are simultaneously awarded, Super Feature 2 is awarded. 10 free games are awarded. SCAT1, SCAT2 and SCAT3 are replaced by GOLD SCAT during this feature. Each column grows to 6 symbol positions high and 100 lines are played (a characteristic of Feature 1). If WILD appears in any position on reels 2, 3 4 and/or 5, the reels are nudged so that all symbols on that reel become WILD. As described above, each GOLD SCAT appearing reveals a wheel spin (see wheel feature section), a credit prize or a letter "M" "I" "N" "A" "J" "O" "R" "G" "N" "D" "S" "U" "P" "E" on the symbol, determined via a series of weight tables. Any credit prize appearing during the free games is instantly awarded. There are 5 jackpots with names: GRAND, SUPER, MAJOR, MINOR and MINI. If a letter appears on the reels, it is counted towards spelling one of the jackpot names. When the name of the jackpot is completely collected, the respective jackpot is awarded (a characteristic of Feature 3).

After the jackpot is awarded the jackpot name is reset and may be triggered again during the remainder of the feature. Weight tables are reset if all prizes within the weight table have been awarded. Features cannot be triggered during this feature.

Super Feature 3 (Feature 2+Feature 3)

If a SCAT2 and SCAT3 feature are simultaneously awarded, Super Feature 3 is awarded. 10 free games are awarded. SCAT1, SCAT2 and SCAT3 are replaced by GOLD SCAT during this feature. Line wins are multiplied by 3. This multiplier is displayed in the top right corner of the main screen. Each GOLD SCAT appearing reveals a wheel spin (see wheel feature section), a credit prize or a letter "M" "I" "N" "A" "J" "O" "R" "G" "N" "D" "S" "U" "P" "E" on the symbol, determined via a series of weight tables as above, however in this feature it may also reveal extra free games (a characteristic of Feature 2).

Any credit prize appearing during the free games is instantly awarded. In the top screen there are 5 jackpots with names: GRAND, SUPER, MAJOR, MINOR and MINI. If a letter appears on the reels, it is counted towards spelling one of the jackpot names. When the name of the jackpot is completely collected, the respective jackpot is awarded (a characteristic of Feature 3). After the jackpot is awarded the jackpot meter and jackpot name is reset and may be triggered again during the remainder of the feature. Weight tables are reset if all prizes within the weight table have been awarded. Features cannot be triggered during this feature.

Mega Feature (Feature 1+Feature 2+Feature 3)

If a SCAT1, SCAT2 and SCAT3 feature are simultaneously awarded, a Mega Feature is awarded. 10 free games are awarded. The window Grows to 6 symbol positions high and 100 lines are played. SCAT1, SCAT2 and SCAT3 are replaced by GOLD SCAT during this feature. If WILD appears in any position on reels 2, 3 4 and/or 5, the reels are nudged so that all symbols on that reel become WILD. Line wins are multiplied by 3.

Each GOLD SCAT appearing reveals a wheel spin (see wheel feature section), a credit prize or a letter "M" "I" "N" "A" "J" "O" "R" "G" "N" "D" "S" "U" "P" "E" on the symbol, determined via a series of weight tables as above, however in this feature it may also reveal extra free games. Any credit prize appearing during the free games is instantly awarded.

There are 5 jackpots with names: GRAND, SUPER, MAJOR, MINOR and MINI. If a letter appears on the reels, it is counted towards spelling one of the jackpot names. When the name of the jackpot is completely collected, the respective jackpot is awarded. After the jackpot is awarded the jackpot name is reset and may be triggered again during the remainder of the feature.

Weight tables are reset if all prizes within the weight table have been awarded. Features cannot be triggered during this feature.

As indicated above, features can be triggered from a number of the feature games. In this example, Feature 1, Feature 2 and Feature 1+Feature 2 (Super Feature 1) involve processor 204 configuring the dynamic SCAT symbols so that the behavior is like the base game, where they will randomly become SCAT1, SCAT2, SCAT3 or WHEEL SCATTER. In this example, If WHEEL SCATTER lands in one of these features, the Wheel Feature is always awarded—that is, in this example the initiation condition for the Wheel Feature is a WHEEL SCATTER being selected as opposed to the base game instance where the imitation condition is reliant on the random determination following selection of a WHEEL SCATTER.

During any Feature involving Feature 3, all SCAT are WHEEL SCATTER already so the Wheel Spin Feature will be triggered by a WHEEL SCATTER prize reveal. That is, a random determination.

Figure 11:
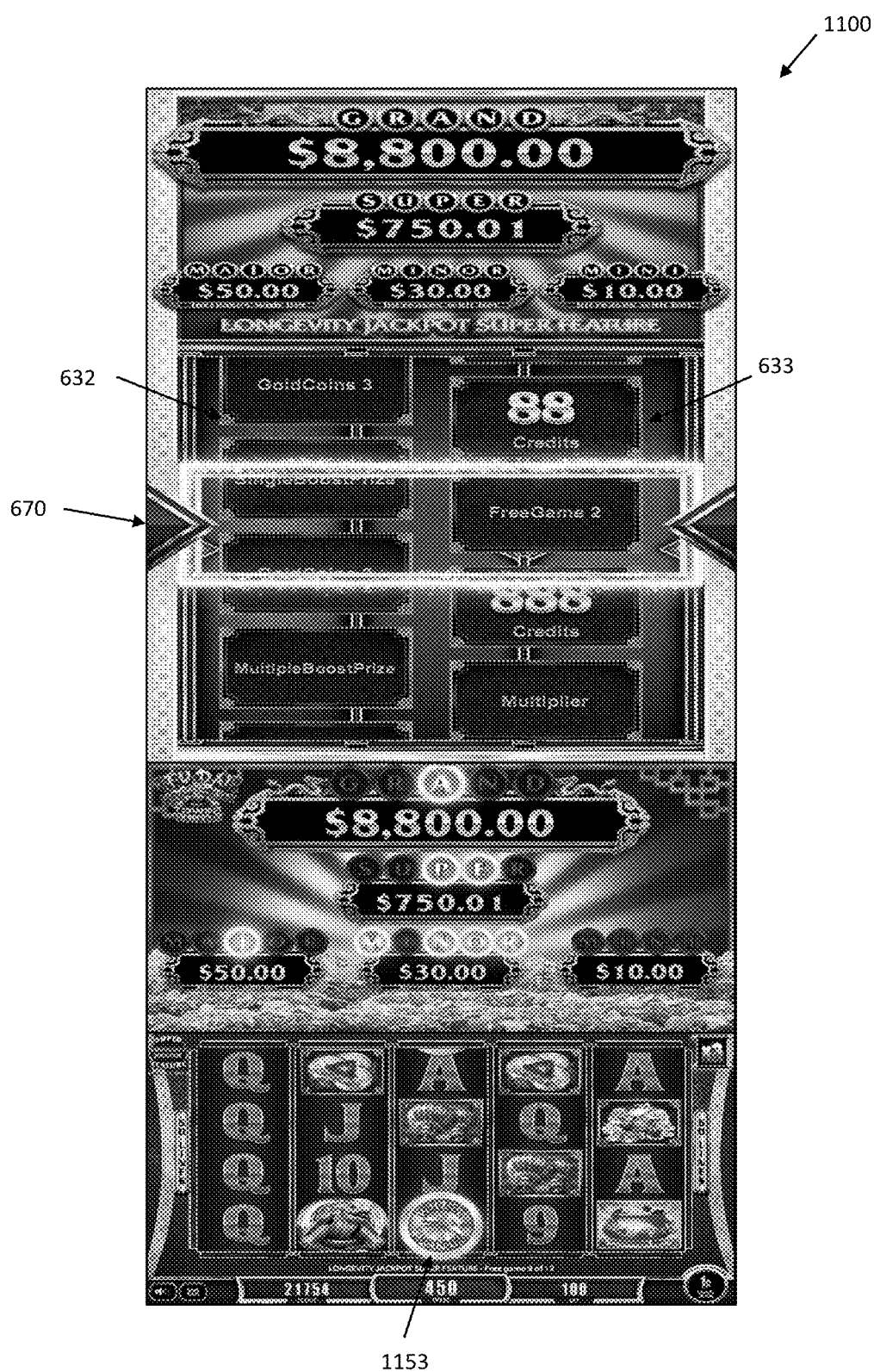

In either case, the wheel(s) spun by the processor will correspond to the current feature. For example, for Feature 1+Feature 3 (Super Feature 2), Wheel 1 and Wheel 3 will be spun and two prizes awarded. In this respect, it will be appreciated that screen display 1000, shows second 632 and third 633 wheels corresponding to an award of the composite feature "Super Feature 3". FIG. 11 is an example of an animation of such a wheel spin responsive to WHEEL SCATTER 1153 being selected. It will be observed that processor 204 controls display 204 to display the wheels at a scale corresponding to the number of active wheels.

In addition, as described above, a spin of one or more wheels can be awarded by processor 204 during individual features.

Figure 14:
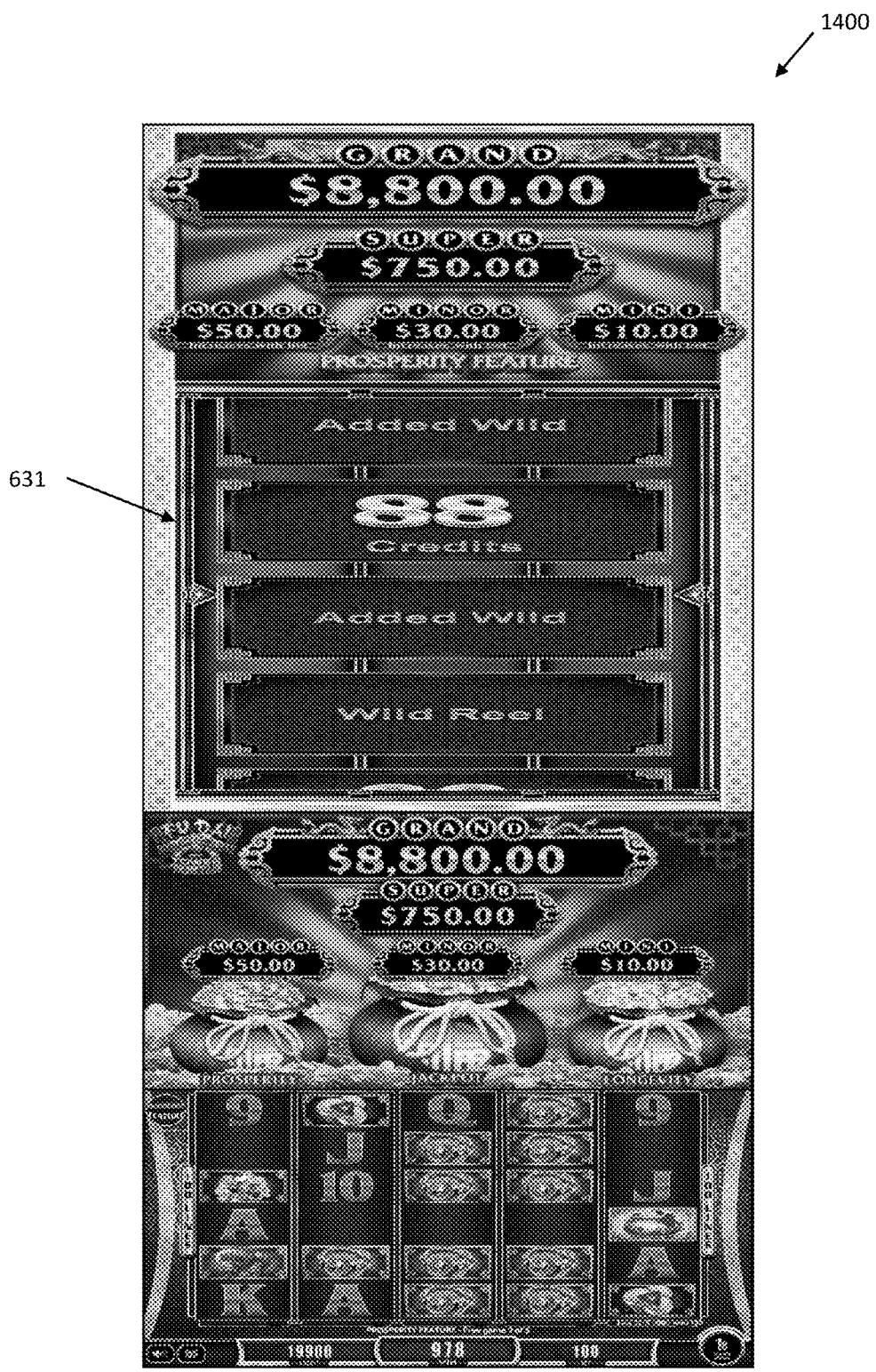

In Feature 1, processor 204 selects from Wheel 1 631 that can award credit prizes or a "Wild Reel" as shown in the example screen display 1400 of FIG. 14. Credit prizes will be awarded instantly. When "Wild Reel" is first awarded, for the remainder of the free games there will be ONE wild reel whose position is evaluated each spin by processor 204 based on a weight table. The next time "Wild Reel" is awarded, there will be TWO wild reels for the remainder of the free games whose positions are determined by processor based on a weight table, and so on. In some examples, the number of wild reels is capped, at which point the "Wild Reel" prize will be removed from set of possible prizes.

Figure 12:
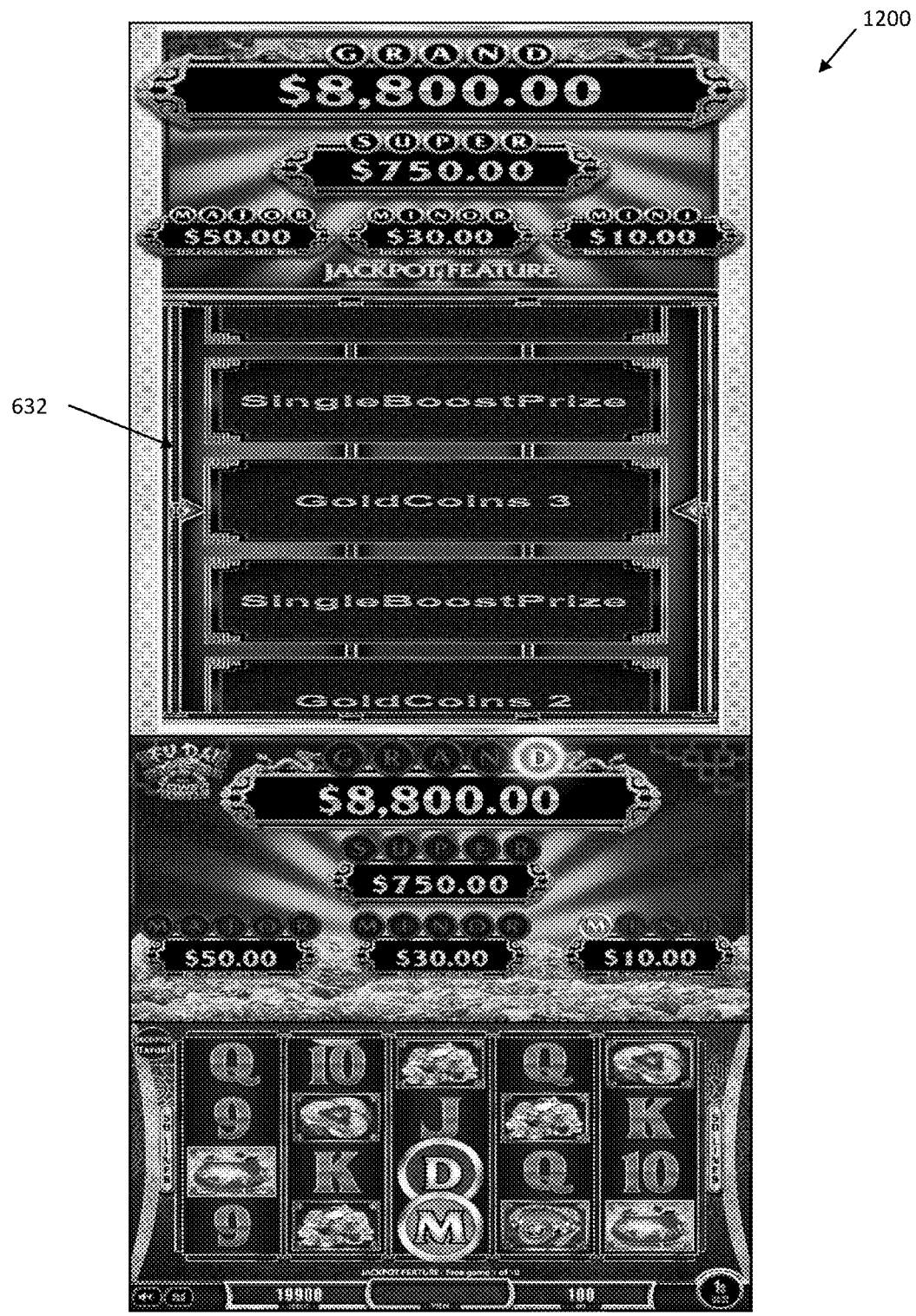
Figure 13:
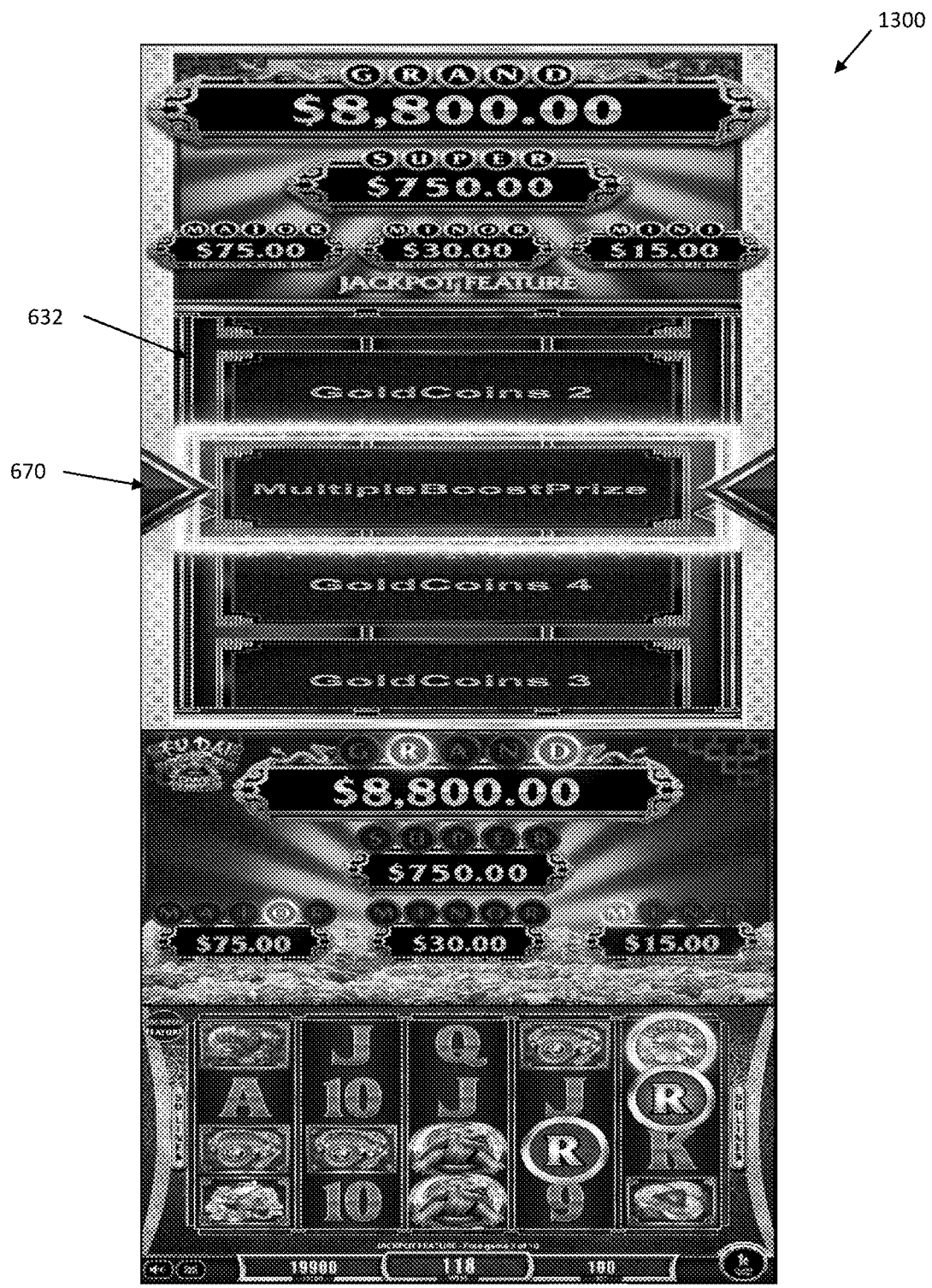

In Feature 2, spinning of Wheel 2 by processor 204 can award credit prizes, additional free games, or a multiplier Boost as shown in example screen displays 1200 and 1300 of FIGS. 12 and 13 respectively. Credit Prizes and additional free games are awarded by processor 204 instantly. Multiplier Boost will increase the line win multiplier for the remainder of the free games when processor 204 evaluates the selected symbols for winning combinations. In this example, the multiplier has levels and is boosted by the processor 204 by one level each time "Multiplier Boost" is awarded. If the maximum level is reached the "Multiplier Boost" prize will be removed from the list of possible prizes by processor 204

In Feature 3, spinning of Wheel 3 can award additional gold coins ("GOLD SCAT"), a Mini/Minor/Major Boost, or result in more scatter symbols being added to the reel strips from which symbols are selected.

Additional gold coins will spin and reveal prizes but from the wheel rather than the reel window. Mini/Minor/Major Boost will increase the value of the respective bonus prize. Mini/Minor/Major Bonus is reset when won or at the end of the feature, whichever is first.

When "additional scatters added to reels" is awarded by processor 204, processor 204 controls the display 204 to play an animation played showing more GOLD SCAT being added to the reel strips. New reel strips will then be selected by processor 204 from memory 208 for the remainder of the free games. Each time this happens, the new set of reel strips will include more SCAT than the previously used set. This prize has a maximum number of awards and when reached, the prize will be removed by processor 204 from the list of possible prizes.

In other example embodiments there may be variations on the game play mechanics of feature games implemented by the processor 204 and, as a result, variations in the game play mechanics of the composite features. For example, Feature 1 could incorporate the game play characteristic described above of the reel strips growing (that is the processor 204 adding additional symbol positions for each column) in combination with a game play characteristic of adding additional wild symbols to the reel strips used for selecting symbols during Feature 1.

Similarly, in Feature 2, the multiplier could be randomly selected by processor 204 from plurality of multipliers, e.g.

ranging in value from 2× to 10×, using a weight table defining the relative probabilities of the multipliers being selected.

Figure 22:
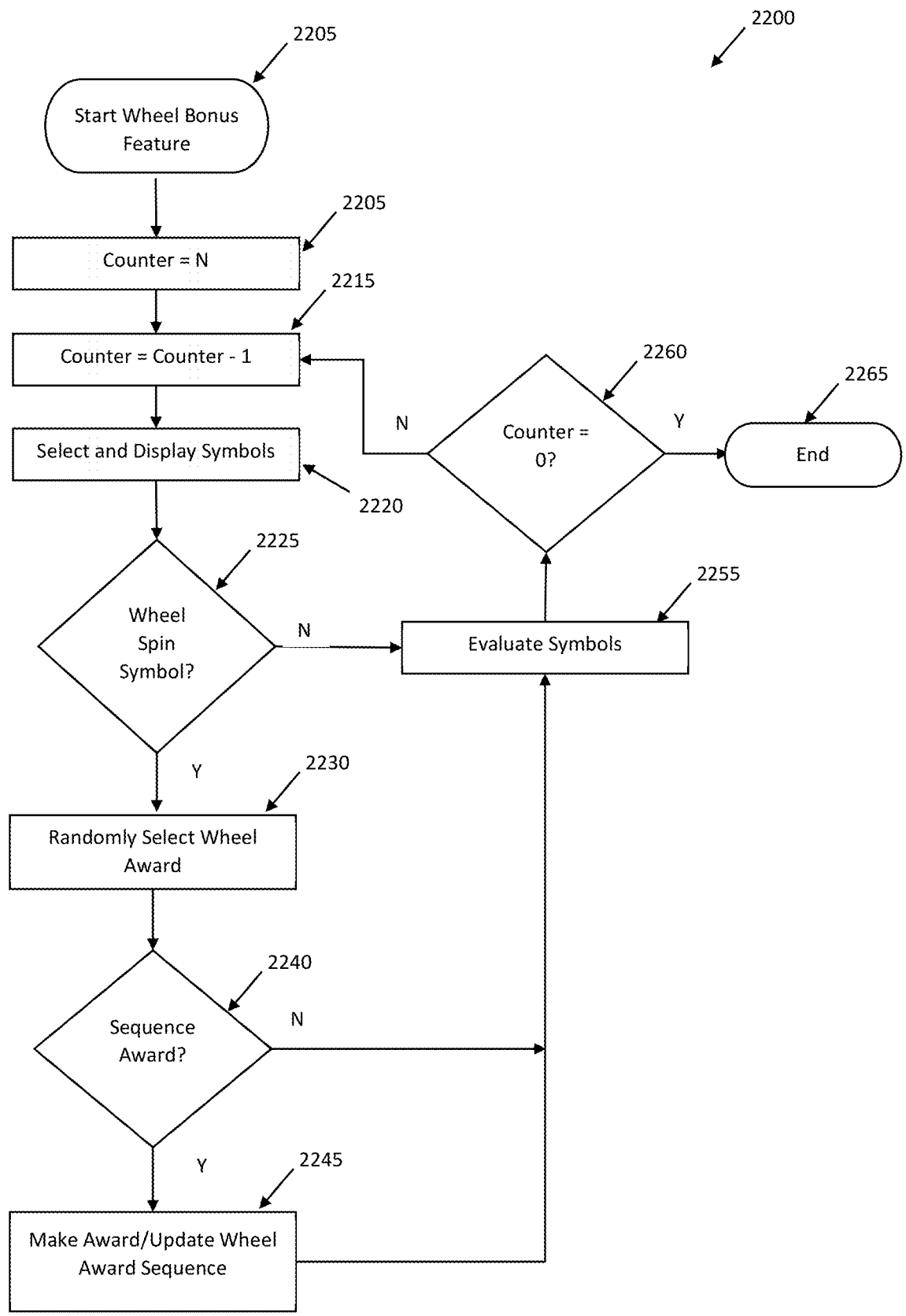
FIG. 22 is another flow chart of a method of operating an electronic gaming machine.

In an example method 2200 of operating a gaming device shown in FIG. 22, a Wheel Bonus game mechanic can be initiated by processor 204, for example, during an eligible feature such as Feature 1 or Feature 2. When the Wheel Bonus is initiated, an award from an award sequence may be awarded by processor 204 such that there is a chance of the next award in the award sequence being awarded when the wheel feature is initiated by the processor 204 again. Advantageously, each award from the award sequence confers an additional benefit relative to the prior award in the award sequence.

The method 2200 shown in FIG. 22 can be implemented during conduct of a Feature at step 580. At step 2205, the processor 204 starts a Wheel Bonus Feature (that is, a feature during which a Wheel Bonus is eligible to be triggered).

At step 2210, processor set a counter to N, where N is the number of game instances (free games) awarded by the relevant feature.

At step, 2215 processor 204 decrements the counter by one to reflect initiation of a game instance. At step 2220, processor 204 selects symbols from the reel strips defined for use during the respective feature and controls the display 240 to display the selected symbols at symbol positions (e.g. using the method described in relation to FIG. 4. At step 2225, processor 204 determines whether the selected symbols include a defined symbol for initiating a wheel spin, in this example, a "Wheel Bonus" symbol 1510, 1910 as shown in FIGS. 15, 16, and 19-21.

Figure 15:
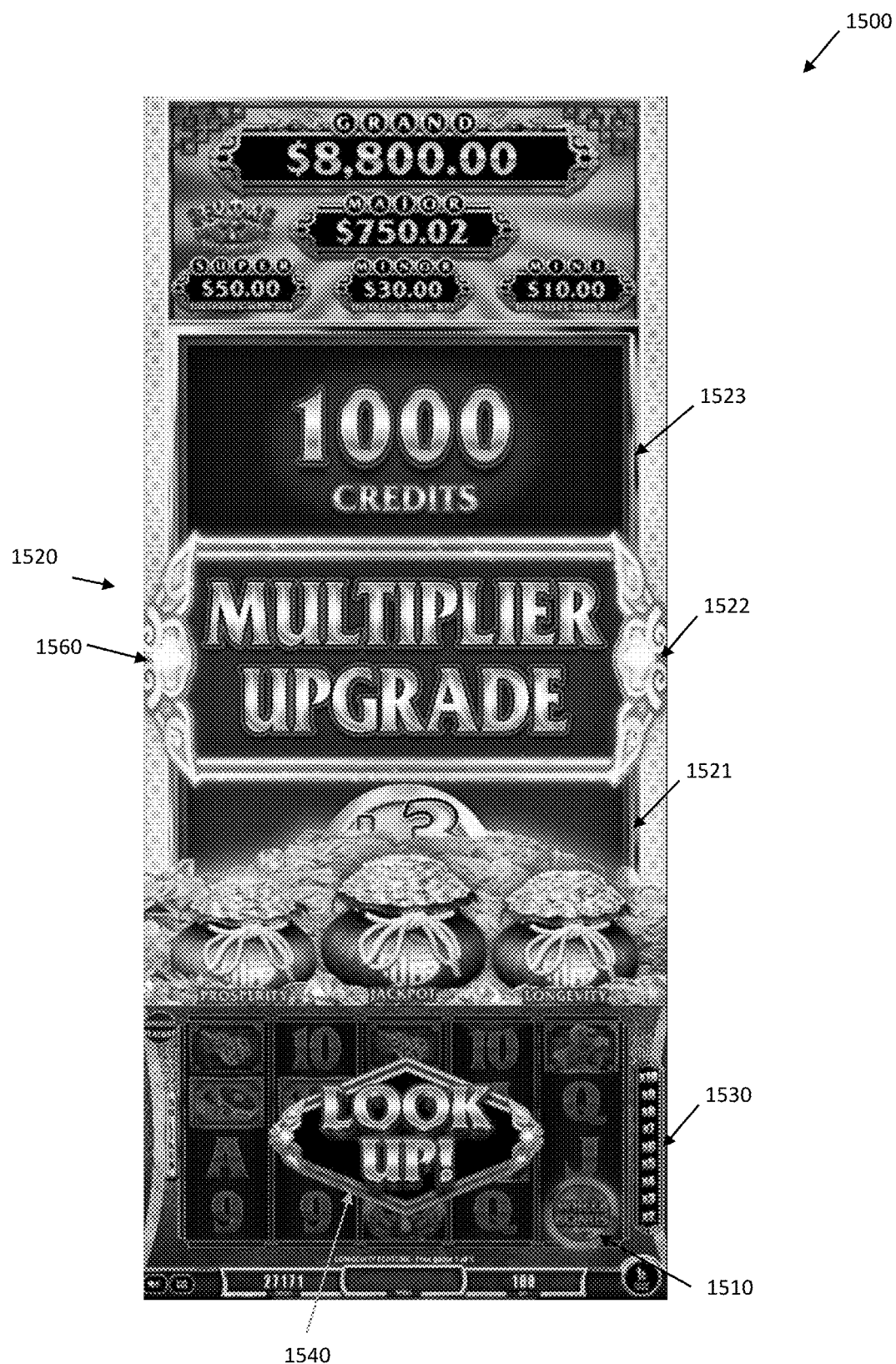

Upon making a positive determination at step 2225, processor 204 proceeds to step 2230 and makes a random determination as to which award will be made using a weighting table and a value returned from RNG 212, for example by selecting a stopping position for the wheel in a manner analogous to determining a stopping position of a reel strip. In this respect, as shown in the example screen display 1500 of FIG. 15, wheel 1520 has a plurality of segment, with three segments 1521-1523 visible on the display 240. In this example, processor 204 animates wheel to rotate around an axis consistent with rotation of the reels until the segment with the selected award stops at a reference position 1560. In an example, wheel 1520 has twelve segments but it will be appreciated that the number of segments can vary depending on implementation. The screen display 1500 of FIG. 15 is a display towards the end of animation of the spinning of the wheel to a stop.

Screen display 1500 corresponds to Feature 2 and multiplier indicator 1530 is used to show the available multipliers and the multiplier selected for the current game instance as explained in more detail below. Multiplier indicator 1530 is shown in more detail in FIG. 18. In FIG. 15, the game message 1540 "Look Up!" indicates to the player that they should look at the outcome being generated on the wheel.

Figure 16:
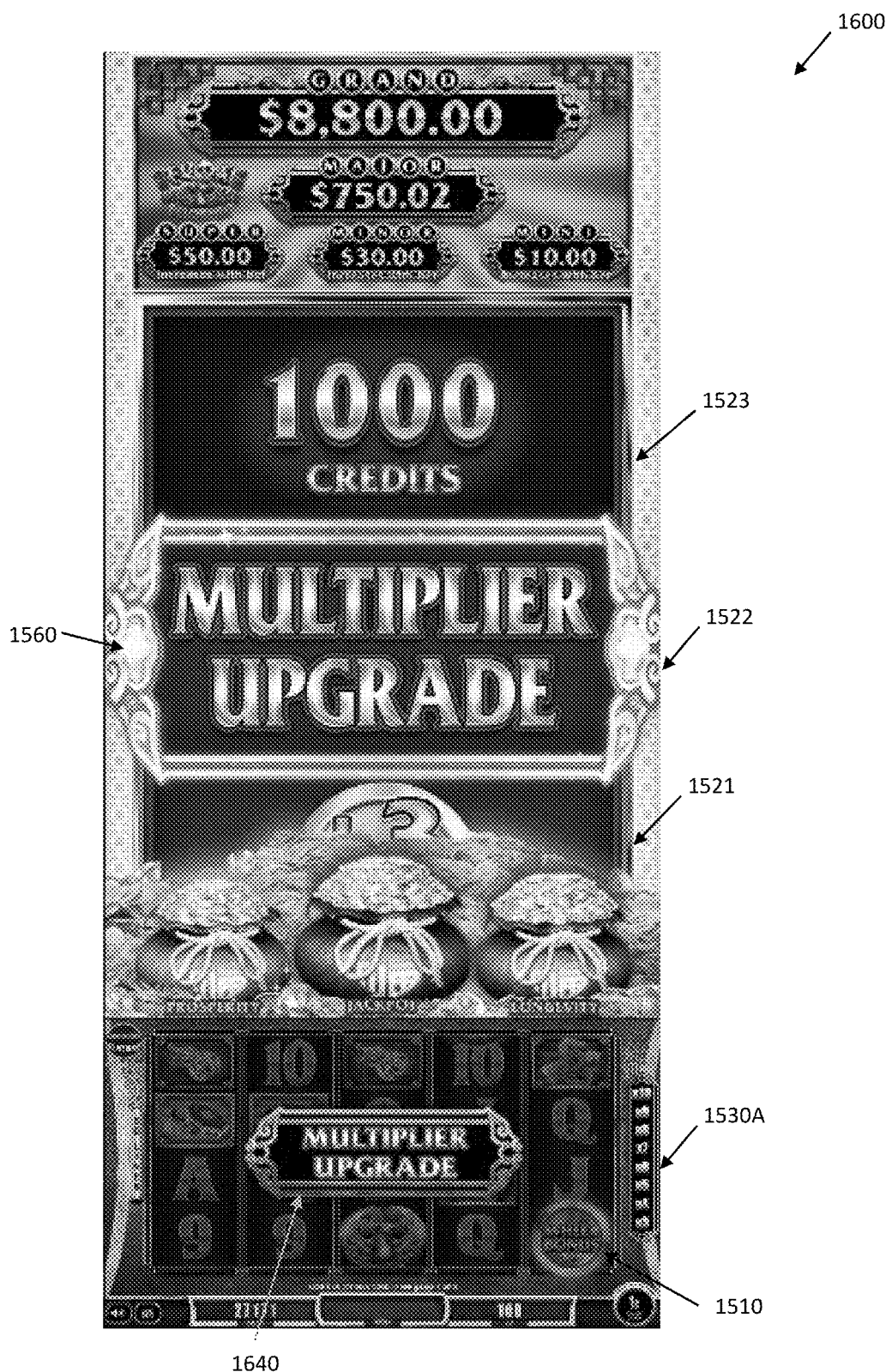
Figure 18:
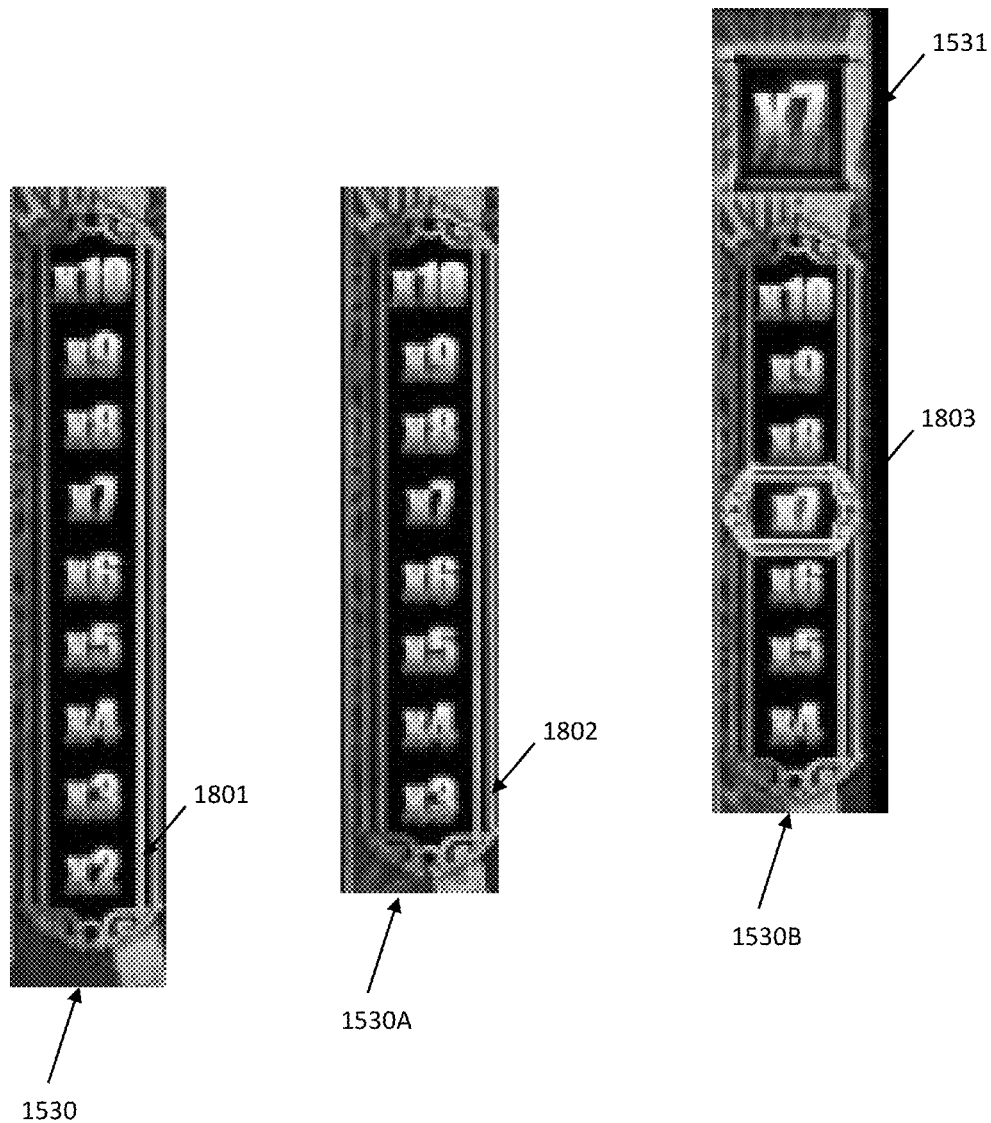
FIG. 18 is a side-by side comparison of different multiplier indicator states of an embodiment.

FIG. 16 is a subsequent screen display where the award message 1640 indicates that the award from the wheel spin of the Wheel Feature is a "Multiplier Upgrade" because segment 1522 that carries the award "Multiplier Upgrade" has stopped at the reference. In FIG. 16, the multiplier indicator 1530A has been updated to reflect the award of the multiplier upgrade as better seen in the side-by-side comparison of multiplier indicators 1530 and 1530A in FIG. 18. In this respect, as shown in FIG. 18, the multiplier indicator 1530A has had the ×2 multiplier removed. As well as making this visual change, processor 204 removes the ×2 multiplier from the weight table used to select multipliers for each subsequent game instance of Feature 2 so that it cannot be selected.

Referring to FIG. 22, in this example, at step 2240 processor 204 will have determined that the award is part of a sequence award and proceeded to step 2245 to make the award and update the award sequence. In this example, the next award will be to remove the ×3 multiplier from the weight table. That is, the award sequence is to progressively remove multipliers from the lowest to second from highest multiplier. Put another way, by removing the relevant multiplier from the weight table, processor 204 updates the state of the gaming device such that the next multiplier in the sequence will be the next to be removed.

Figure 17:
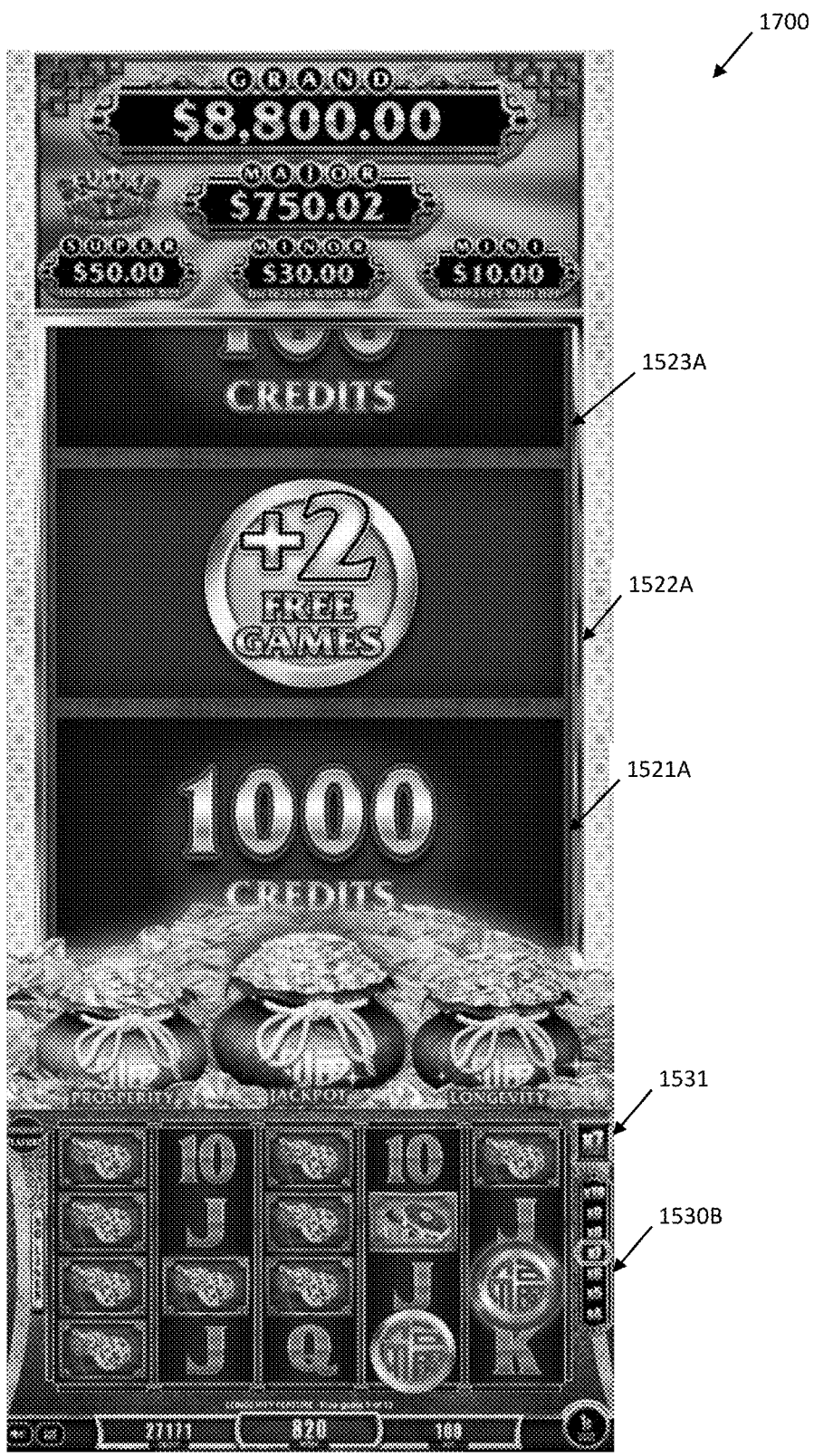

In this respect, FIG. 17 is an example screen display showing an award of a ×7 multiplier 1531 in a game instance of Feature B in a subsequent game instance where the ×3 multiplier has also been removed from multiplier indicator. FIG. 18 has a side-by-side comparison of multiplier indicators 1530A and 1530B showing that the ×3 multiplier 1802 has been removed and also how the awarded ×7 multiplier is highlighted on the display by the processor.

In this respect, it will be appreciated that the game mechanic of the award sequence improves the opportunity for the player to win larger awards. In this example, by preventing processor 204 from selecting the lower end multipliers of Feature B. That is, when performing the selection of the ×7 multiplier of FIG. 17, processor 204 was selecting from multipliers ranging from ×4 to ×10 instead of ×2 to ×10 when Feature B was first initiated.

In this example, the processor can 204 can continue make awards in the award sequence until only the ×10 multiplier remains at which point the processor 204 updates the wheel by replacing the "Multiplier Award" with another prize such that there will be a negative determination at step 2240 in all remaining game instances and the ×10 multiplier will be awarded in each remaining game instance.

At step 2255, processor 204 evaluates the selected symbols based on a pay table in memory and, in the example of FIGS. 15 to 18, by also applying the selected multiplier.

Figure 19:
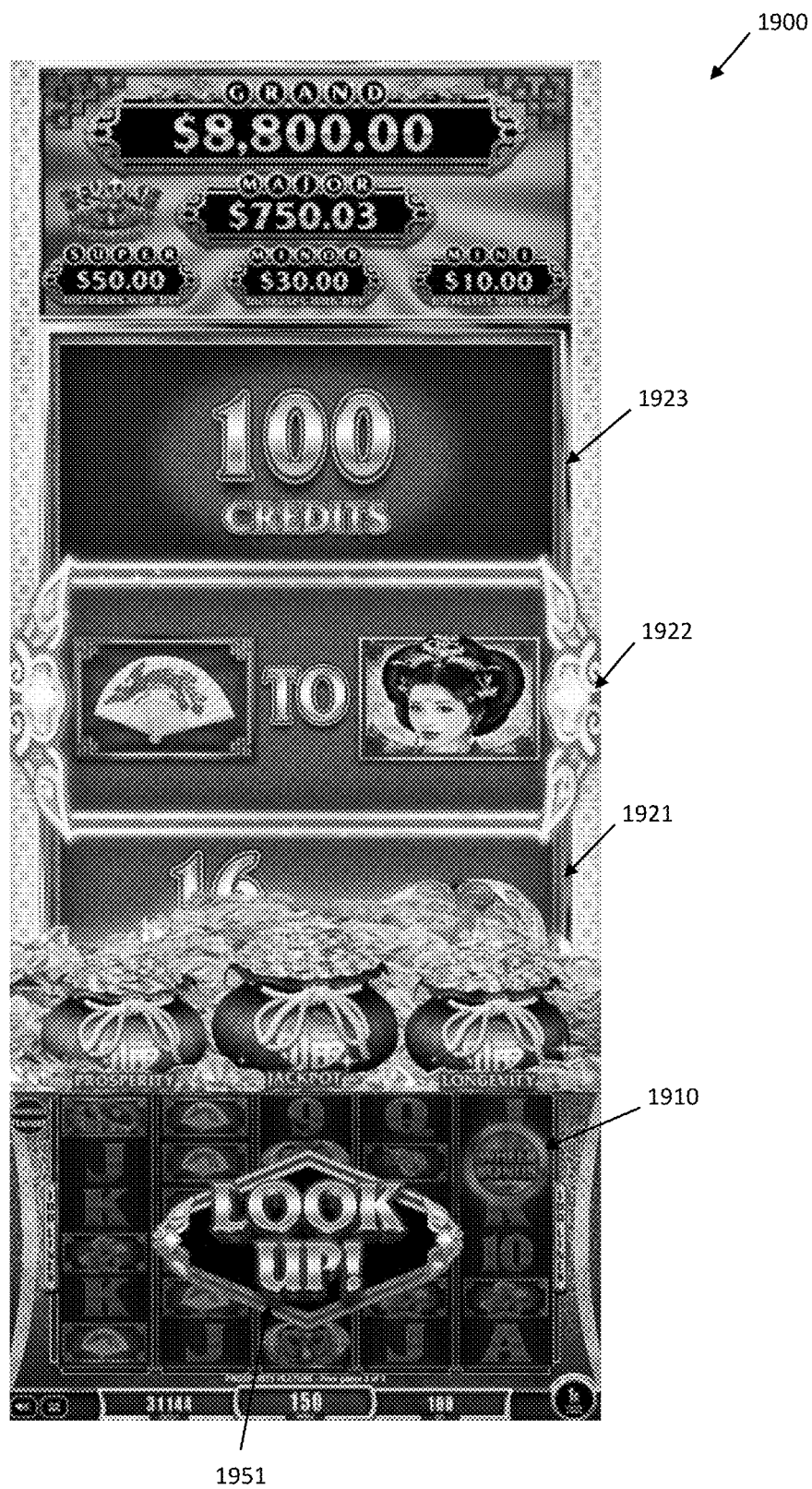
FIGS. 19 to 21 are exemplary screen displays.
Figure 20:
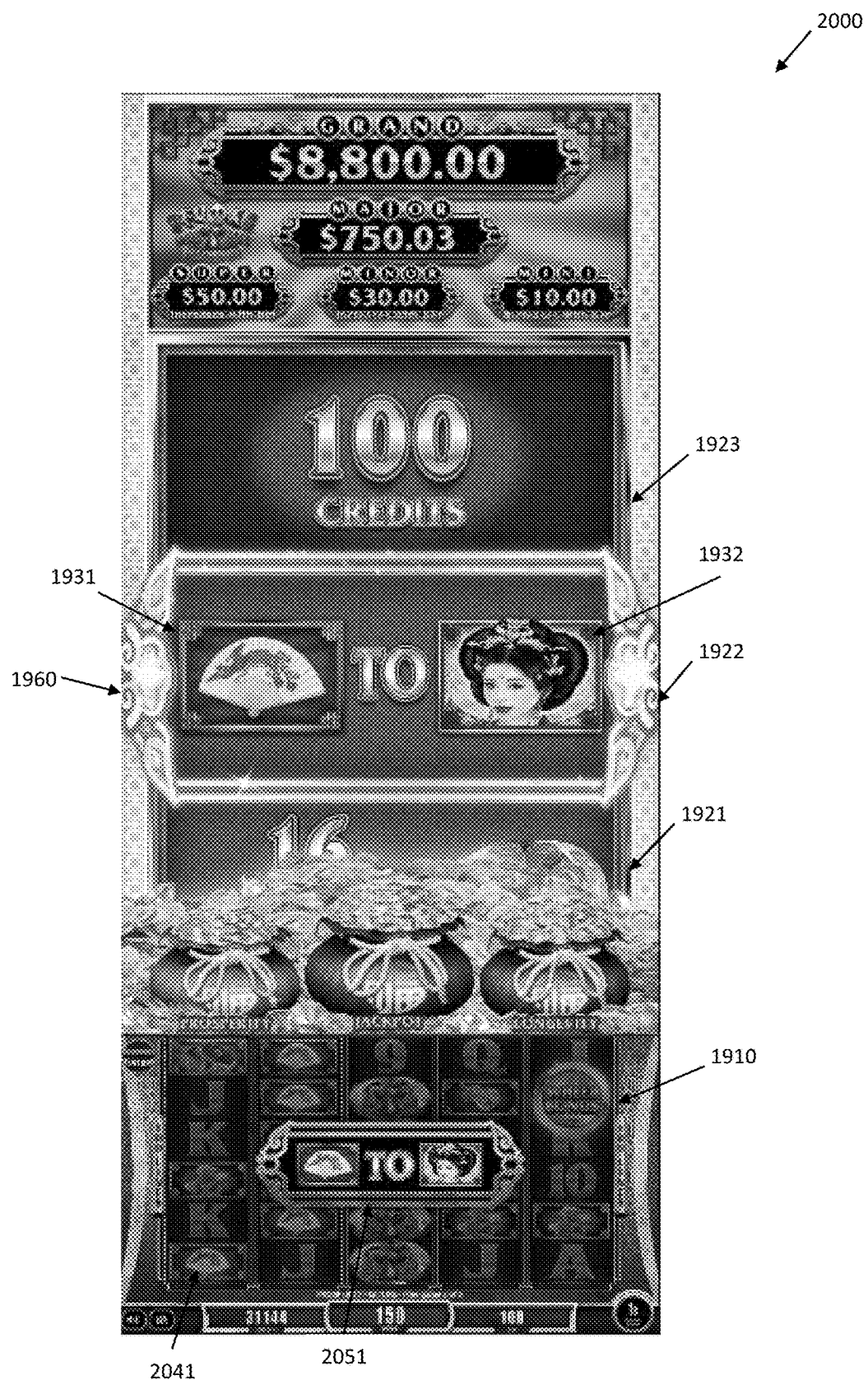
Figure 21:
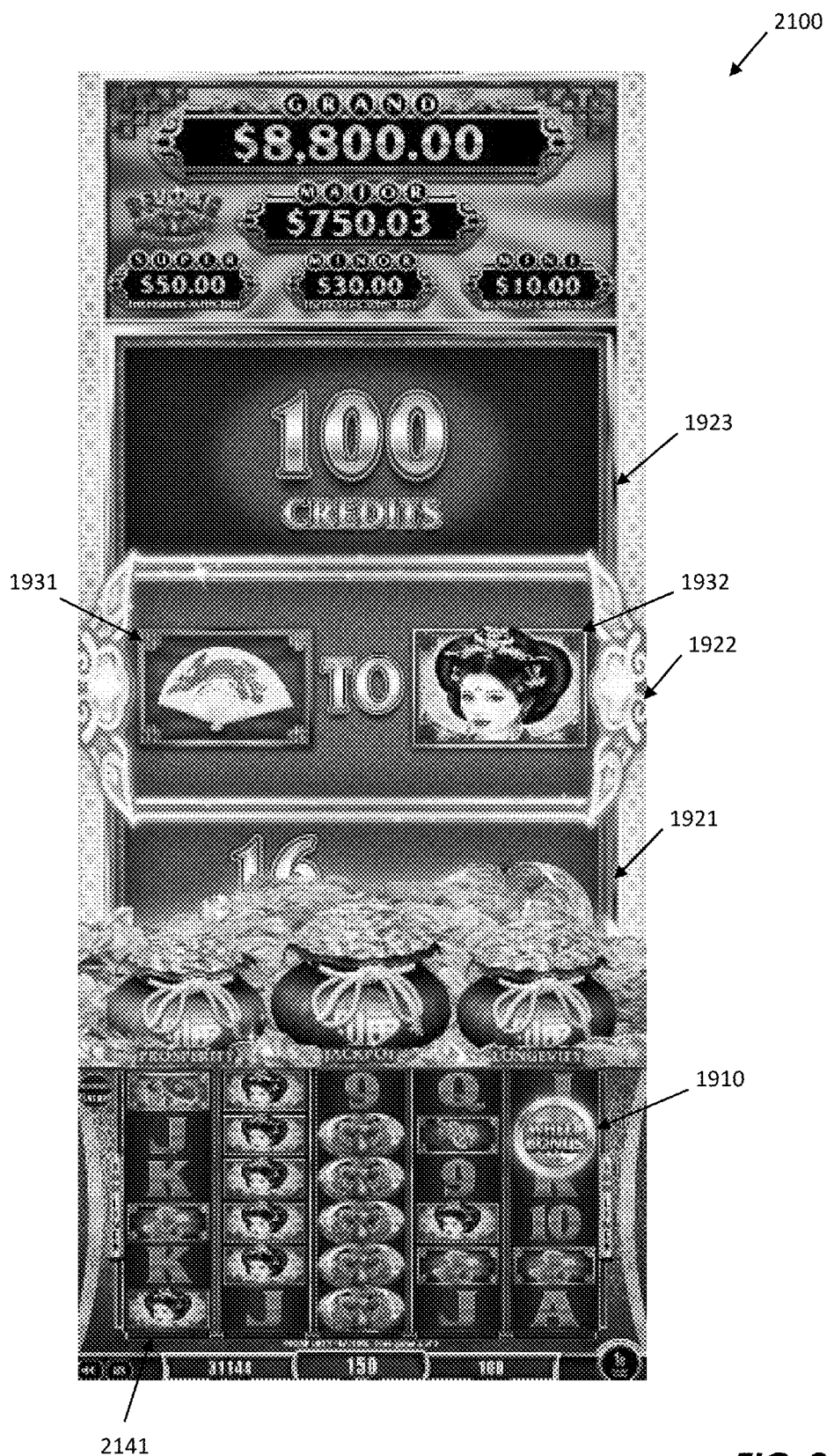

At step 2260, processor 204 determines whether the counter has reached zero; that is, whether all the awarded game instances have been conducted. Upon making a negative determination, processor 204 initiates the next game instance by decrementing the counter at step 2215. Alternatively, upon the processor 204 making a positive determination at step 2260, the feature game ends 2265, FIGS. 19 to 21 illustrate an alternative award sequence in connection with Feature 1. In this example, the implemented award sequence relates to sequential changes to the reel strips which both increase the chance of a winning combination being selected by the processor 204 and the quantum of awards made by the processor. In this example, and consistent with the example of FIG. 3, a number of the symbols on the reel strips are "PIC" symbols having graphical components consistent with the theme of the game. The numbering of PIC1 to PIC5 indicates a relative hierarchy of these symbols consistent with prizes defined in the pay table in memory with PIC1 having higher prizes than PIC2 for the same number of symbols, PIC2 having higher prizes than PIC3 which, in turn, has higher prizes than PIC4 which has higher prizes than PIC5. In this example, the award sequence, is to replace the PIC symbols with the PIC1 symbol in the sequence PIC5, PIC4, PIC3 and PIC2.

Accordingly, when processor 204 selects a wheel segment at step 2230 corresponding to an award from the award sequence, steps 2240 and 2245 result in the processor 204 changing the currently displayed symbols prior to evaluating the symbols at step 2255 by changing the current lowest ranked symbol to PIC1. Processor 204 also changes all instances the current lowest ranked symbol to PIC1 on the reel strips for all subsequent game instances.

In this respect, FIG. 19 is an example screen display 1900 at a similar game state to FIG. 15. As with FIG. 15, FIG. 19 shows three wheel segments 1921-1923 and a game message 1951 instructing the player to "Look Up!". The wheel spin has been initiated in response to selection of a defined symbol in the form of "Wheel Bonus" symbol 1910.

FIG. 20 shows a subsequent screen display 2000 where the wheel has stopped with segment 1922 in registration with reference positions 1960. Segment 1922 shows a Fan symbol 1931 which is PIC5 in this example, and Princess symbol 1932 which is the PIC 1 symbol. That is, segment 1922 indicates that the award will be to change all PIC5 symbols to PIC 1 symbols and award message 2051 indicates that this award will be made by processor 204 at step 2245.

FIG. 21 is an example screen display 2100 after processor 204 makes the award. In this respect, processor 204 has replaced all instances of PIC5/Fan symbols (e.g. PIC5 symbol 2041) with the PIC1/Princess symbol (e.g. PIC1 symbol 2141). Accordingly, the replacement has the potential that higher prizes will be awarded in respect of the game instance. As indicated above, should a further sequence award be made in a subsequent game instance, processor will replace the next symbol in the sequence with PIC1. In this example, setting the state of the gaming device so that PIC4 will be the next symbol removed.

Figure 23:
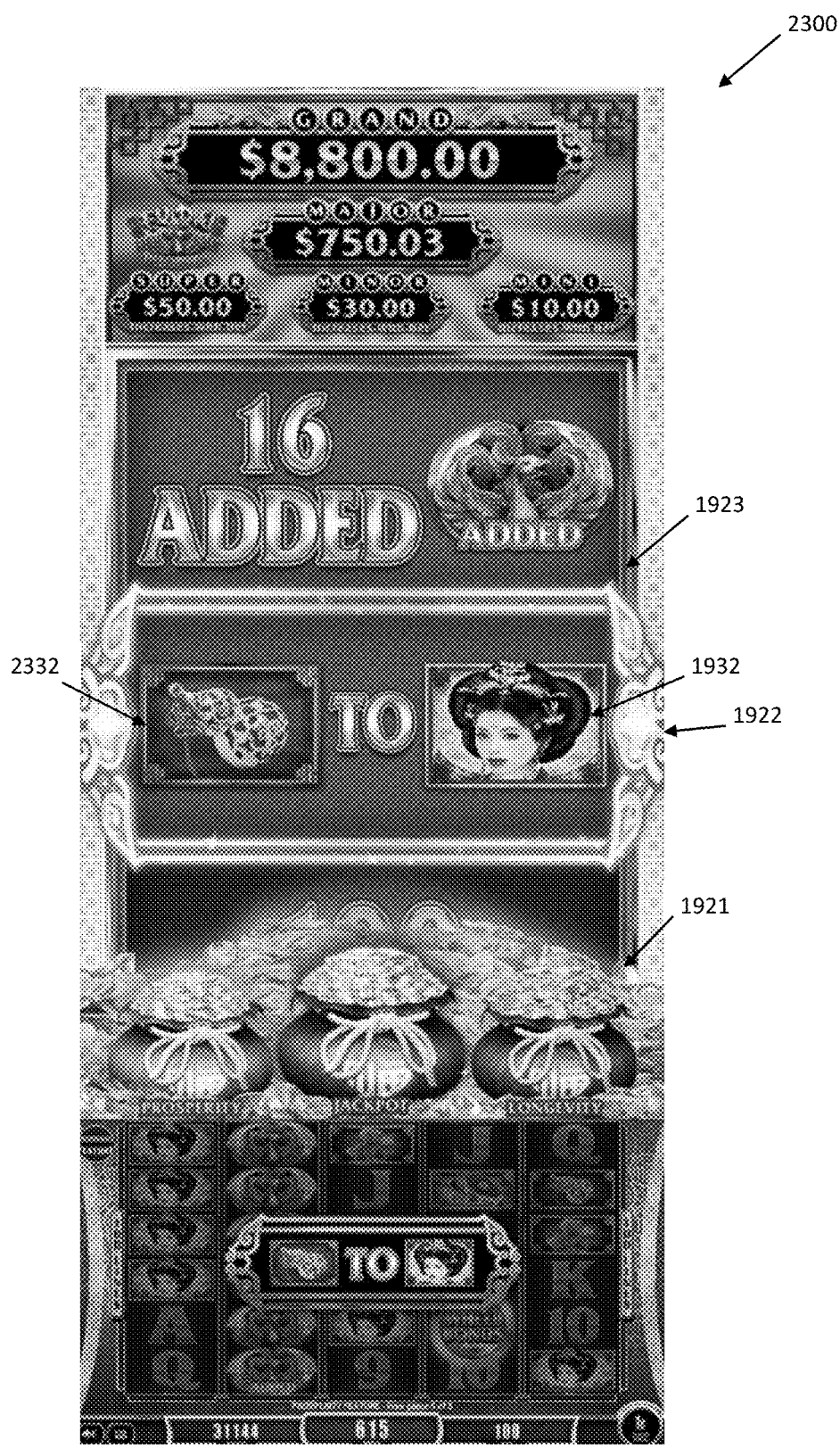
FIG. 23 is an example screen display.

In this respect, screen display 2300 of FIG. 23 shows that in this example, processor 204 also updates the awards displayed on the wheel to reflect the current position in the award sequence. In this example, segment 1922 is updated to show that the award will be changing all Money Bag/PIC4 symbols to Princess/PIC1 symbols. That is, as result of processor 204 awarding the change of PIC5 to PIC1, the next change of PIC4 to PIC1 has become available and has been awarded by processor 204.

Example Embodiments

In an embodiment, there is an electronic gaming machine comprising a display device, a random number generator, a processor, and a memory storing instructions which, when executed by the processor, cause the processor to, in response to a feature wheel initiation condition being met: select, based on one or more random numbers dynamically generated by a random number generator, stopping positions for a plurality of feature wheels, each of the feature wheels associated with a different feature event corresponding to a spinning reel, and each of the feature wheels comprising a plurality of outcomes at different wheel positions, wherein the different wheel positions of each of the feature wheels correspond to an outcome comprising a feature event associated with each of the feature wheels; control the display device to display spinning of the plurality of feature wheels to the selected stopping positions; determine based on the selected stopping positions, whether to provide the outcome from each feature wheel; and upon determining to provide more than one outcome comprising a feature event, initiate a composite feature event comprising characteristics of each of the feature events so that only a single feature event is initiated from the wheel spin, wherein the composite feature event animates special effects on the display device.

In an example, the electronic gaming machine memory stores reel data defining a plurality of reel strips and a plurality of scatter symbols including at least one wheel scatter symbol and when the instructions are executed, they cause the processor to: select, in a spinning reel event, based on the one or more random numbers dynamically generated by the random number generator, a plurality of symbols based on the reel data; control the display device to display the plurality of symbols selected at a plurality of columns of symbol positions, each column corresponding to a reel strip; and determine that the feature wheel initiation condition is met upon a trigger condition being met by accessing a weighted table in the memory to determine the at least one wheel scatter symbol is included in the plurality of symbols selected.

In an example, the electronic gaming machine includes when the instructions are executed, they cause the processor to control the display to display the columns of symbol positions in a first display area and the feature wheels in a second display area.

In an example, the electronic gaming machine includes the second display area above the first display area.

In an example, the electronic gaming machine includes when the instructions are executed, they cause the processor to conduct any feature event in the first display area.

In an example, the electronic gaming machine includes wherein the random determination is based on data defining the relative probability of the feature wheel trigger condition being met.

In an example, the electronic gaming machine includes wherein the reel data defines at least one dynamic symbol position among the plurality of reel strips, and the reel data comprises the weighted table defining the relative probabilities of a plurality of scatter symbols including the wheel scatter symbol being selected for the at least one dynamic symbol position, and wherein when the instructions are executed they cause the processor to configure the reel strips prior to selecting the symbols by randomly selecting a scatter symbol of the plurality of scatter symbols for each dynamic symbol position based on the one or more random numbers dynamically generated by the random number generator.

In an example, the electronic gaming machine is configured to trigger at least one alternative feature event to the feature events associated with the respective feature wheels in response to a determining that an alternative trigger condition is met.

In an example, the electronic gaming machine includes wherein selecting the plurality of symbols based on the reel data occurs during a feature event.

In an example, the electronic gaming machine includes wherein the feature wheel initiation condition comprises a collection of a defined set of symbols over a plurality of event instances.

In an example, the electronic gaming machine includes wherein the plurality of event instances are part of a symbol collection feature initiated by the processor in response to a symbol collection feature condition being met.

Another example embodiment describes a non-transitory computer readable medium for conducting a feature event on a system including a display device, a controller, and one or more sequences of instructions which, when executed, cause the controller to perform the steps of: selecting, based on one or more random numbers dynamically generated by a random number generator, stopping positions for a plurality of feature wheels, each feature wheel associated with a different feature event of a spinning reel, each feature wheel comprising a plurality of outcomes at different wheel positions, and each feature wheel being dynamically displayed at a scale corresponding to a number of active feature wheels, wherein at least one wheel position of each wheel corresponds to an outcome of the feature event associated with each feature wheel; controlling the display device to display spinning of the plurality of feature wheels to the selected stopping positions; determining based on the selected stopping positions, whether to display an outcome from each wheel on the display device; and upon determining to make more than one outcome comprising a feature event, display a composite feature event comprising characteristics of each of the displayed feature events so that only a single feature event is graphically provided via visual effects on the display device.

Another example embodiment describes an electronic gaming system comprising: at least one display device; a random number generator; one or more processors; and at least one memory storing instructions which, when executed by the one or more processors, cause the one or more processors to, in response to a feature wheel initiation condition being met: select, based on one or more random numbers dynamically generated by a random number generator, stopping positions for a plurality of feature wheels, each feature wheel associated with a different feature event of a spinning reel, and each feature wheel comprising a plurality of outcomes at different wheel positions, wherein at least one wheel position of each feature wheel corresponds to an outcome of the feature event associated with the feature wheel; control the display device to display spinning of the plurality of feature wheels to the respective selected stopping positions; determine based on the selected stopping positions, whether to provide an outcome from each wheel; and upon determining to make more than one outcome comprising the feature event associated with the feature wheel, animate, on the display device, a composite feature event comprising enhanced and unenhanced characteristics of each provided feature event so that only a single feature event is graphically displayed.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:
1. An electronic gaming machine comprising:
a display device;
a random number generator;
a processor; and
a memory that stores:
  a set of weighted tables that define trigger probabilities for different feature events in compliance with at least one target return to player (RTP); and
  instructions that, when executed by the processor, cause the processor to, in response to a feature wheel initiation condition being met:
    select, based at least in part on one or more random numbers dynamically generated by the random number generator, one or more scatter symbols to land on one or more spinning reels during a spinning reel event;
    select, based at least in part on the one or more scatter symbols, a weighted table from the weighted tables;
    select, based at least in part on the weighted table, stopping positions for a plurality of feature wheels associated with the different feature events corresponding to the spinning reels;
    control the display device to display spinning of the plurality of feature wheels to land at the stopping positions;
    determine a plurality of outcomes that correspond to the stopping positions;
    initiate, based at least in part on the outcomes, a composite feature event that concurrently animates, on the display device, special effects characteristic of a plurality of the different feature events.

2. The electronic gaming machine of claim 1, wherein the memory stores reel data defining a plurality of reel strips and a plurality of scatter symbols including at least one wheel scatter symbol, and wherein instructions, when executed, further cause the processor to:
  select, in a spinning reel event, a plurality of symbols based on the reel data;
  control the display device to display the plurality of symbols selected at a plurality of columns of symbol positions, each column corresponding to a reel strip; and
  determine that the feature wheel initiation condition is met upon a trigger condition being met by accessing a weighted table in the memory to determine the at least one wheel scatter symbol is included in the plurality of symbols selected.

3. The electronic gaming machine of claim 2, wherein the weighted table is based on data defining a relative probability of the trigger condition being met.

4. The electronic gaming machine of claim 2, wherein the reel data defines at least one dynamic symbol position among the plurality of reel strips, and the reel data comprises the weighted table defining relative probabilities of a plurality of scatter symbols including the wheel scatter symbol being selected for the at least one dynamic symbol position, and wherein when the instructions are executed they cause the processor to configure the reel strips prior to selecting the symbols by randomly selecting a scatter symbol of the plurality of scatter symbols for each dynamic symbol position based on the one or more random numbers dynamically generated by the random number generator.

5. The electronic gaming machine of claim 2, wherein selecting the plurality of symbols occurs during a feature event.

6. The electronic gaming machine of claim 1, wherein when the instructions are executed they cause the processor to control the display to display columns of symbol positions in a first display area and the feature wheels in a second display area.

7. The electronic gaming machine of claim 6, wherein the second display area is above the first display area.

8. The electronic gaming machine of claim 6, wherein when the instructions are executed they cause the processor to conduct any feature event in the first display area.

9. The electronic gaming machine of claim 1, wherein the feature wheel initiation condition comprises a collection of a defined set of symbols over a plurality of event instances.

10. The electronic gaming machine of claim 9, wherein the plurality of event instances are part of a symbol collection feature initiated by the processor in response to a symbol collection feature condition being met.

11. The electronic gaming machine of claim 1, wherein, the electronic gaming machine is configured to trigger at least one alternative feature event to the feature events associated with each of the feature wheels in response to a determining that an alternative trigger condition is met.

12. A non-transitory computer readable medium for conducting a feature event on a system including a display device, a controller, and one or more sequences of instructions that, when executed, cause the controller to:
select, based at least in part on one or more random numbers dynamically generated by a random number generator, one or more scatter symbols to land on one or more spinning reels during a spinning reel event;
select, based at least in part on the one or more scatter symbols, a weighted table from a set of weighted tables that are stored in memory and define trigger probabilities for different feature events in compliance with at least one target return to player (RTP);
select, based at least in part on the weighted table, stopping positions for a plurality of feature wheels associated with the different feature events corresponding to the spinning reels;
control the display device to display, via a graphical user interface, spinning of the plurality of feature wheels to land at the selected stopping positions;
determine, based on the selected stopping positions, whether to display an outcome from each wheel on the graphical user interface; and
initiate, based at least in part on the outcomes, a composite feature event that concurrently animates, on the display device, special effects characteristic of a plurality of the different feature events.

13. The non-transitory computer readable medium of claim 12, wherein the one or more sequences of instructions, when executed, further cause the controller to:
select, in a spinning reel based on the one or more random numbers, a plurality of symbols based on reel data, wherein the reel data defines a plurality of reel strips and a plurality of scatter symbols including at least one wheel scatter symbol;
control the display device to display the plurality of symbols selected at a plurality of columns of symbol positions, each column corresponding to a reel strip from the plurality of reel strips; and
determine that a feature wheel initiation condition is met upon a trigger condition being met by a wheel scatter symbol being included in the plurality of symbols selected.

14. An electronic gaming system comprising:
at least one display device;
a random number generator;
one or more processors; and
at least one memory that stores:
a set of weighted tables that define trigger probabilities for different feature events in compliance with at least one target return to player (RTP); and
instructions that, when executed by the one or more processors, cause the one or more processors to, in response to a feature wheel initiation condition being met:
select, based at least in part on one or more random numbers dynamically generated by the random number generator, one or more scatter symbols to land on one or more spinning reels during a spinning reel event;
select, based at least in part on the one or more scatter symbols, a weighted table from the weighted tables;
select, based at least in part on the weighted table, stopping positions for a plurality of feature wheels associated with the different feature events corresponding to the spinning reels;
control the display device to display spinning of the plurality of feature wheels to land at the selected stopping positions;
determine a plurality of outcomes that correspond to the stopping positions; and
initiate, based at least in part on the outcomes, a composite feature event comprising:
enhanced and unenhanced characteristics of each of the different feature events; and
visual effects representing a combination of the enhanced and unenhanced characteristics of each of the different feature events on a graphical user interface.

15. The electronic gaming system of claim 14, wherein the memory stores reel data defining a plurality of reel strips and a plurality of scatter symbols including at least one wheel scatter symbol, and wherein the instructions, when executed by the one or more processors, further cause the one or more processors to:
select, in the spinning reel, a plurality of symbols based on the reel data and the one or more random numbers;
control the display device to display the plurality of symbols selected at a plurality of columns of symbol positions, each column corresponding to a reel strip; and
determine that a feature wheel initiation condition is met upon a trigger condition being met by a wheel scatter symbol being included in the plurality of symbols selected.

16. The electronic gaming system as claimed in claim 15, wherein the reel data defines at least one dynamic symbol position among the plurality of reel strips, and the reel data comprises a weight table defining relative probabilities of a plurality of scatter symbols including the wheel scatter symbol being selected for the at least one dynamic symbol position, and wherein the instructions, when executed by the one or more processors, further cause the one or more processors to configure the reel strips prior to selecting the symbols by randomly selecting a scatter symbol of the plurality of scatter symbols for each dynamic symbol position based on random numbers dynamically generated by the random number generator.

17. The electronic gaming system as claimed in claim 15, wherein selecting the plurality of symbols based on the reel data occurs during a feature event.

18. The electronic gaming system as claimed in claim 14, wherein the instructions, when executed by the one or more processors, further cause the one or more processors to respond to selection of a wheel scatter by randomly determining whether a trigger condition is met based on dynamically generated numbers from the random number generator.

19. The electronic gaming system as claimed in claim 18, wherein the random determination is based on data defining a relative probability of the trigger condition being met.

20. The electronic gaming system as claimed in claim 14, wherein the instructions, when executed by the one or more processors, further cause the one or more processors to trigger at least one alternative feature event to the feature events associated with the plurality of feature wheels in response to determining that an alternative trigger condition is met.

* * * * *